United States Patent
Kjar et al.

(10) Patent No.: US 9,719,845 B2
(45) Date of Patent: Aug. 1, 2017

(54) LOAD CELL OVERLOAD PROTECTION BY A RELIEVING MECHANISM FOR FLUID DISPENSING SYSTEMS

(71) Applicant: LIFE TECHNOLOGIES CORPORATION, Carlsbad, CA (US)

(72) Inventors: Steven R. Kjar, Logan, UT (US); Whitt F. Woods, North Ogden, UT (US); Paul T. Thacker, Lewiston, UT (US)

(73) Assignee: Life Technologies Corporation, Carlsbad, CA (US)

( * ) Notice: Subject to any disclaimer, the term of this patent is extended or adjusted under 35 U.S.C. 154(b) by 178 days.

(21) Appl. No.: 14/647,388

(22) PCT Filed: Nov. 26, 2013

(86) PCT No.: PCT/US2013/071917
§ 371 (c)(1),
(2) Date: May 26, 2015

(87) PCT Pub. No.: WO2014/085408
PCT Pub. Date: Jun. 5, 2014

(65) Prior Publication Data
US 2015/0300873 A1    Oct. 22, 2015

Related U.S. Application Data

(63) Continuation-in-part of application No. 13/686,400, filed on Nov. 27, 2012, now Pat. No. 8,919,210.

(51) Int. Cl.
*G01G 23/00*    (2006.01)
*G01G 17/04*    (2006.01)
(Continued)

(52) U.S. Cl.
CPC .......... *G01G 23/005* (2013.01); *G01G 17/00* (2013.01); *G01G 17/04* (2013.01); *G01G 19/22* (2013.01); *G01L 1/26* (2013.01); *G01G 19/12* (2013.01)

(58) Field of Classification Search
CPC ........ G01G 17/00; G01G 17/04; G01G 19/12; G01G 19/22; G01G 23/005; G01L 1/26
See application file for complete search history.

(56) References Cited

U.S. PATENT DOCUMENTS 4,095,659 A * 6/1978 Blench ................... G01G 19/12
                                                                 177/136
4,338,825 A * 7/1982 Amlani ................ G01G 3/1412
                                                                 177/156

(Continued)

FOREIGN PATENT DOCUMENTS

DE    169 19 109 C1    1/1998
EP    0 200 281 A2    5/1985
EP    0 769 686 A1    4/1997

OTHER PUBLICATIONS

International Search Report and Written Opinion dated Feb. 21, 2014, issued in PCT Application No. PCT/US2013/071917, filed Nov. 26, 2013.

(Continued)

Primary Examiner — Randy Gibson
(74) Attorney, Agent, or Firm — Workman Nydegger

(57) ABSTRACT

A method for locking out load cells includes dispensing a fluid into a collapsible bag that is supported within a support housing, the support housing resting on a plurality of load cells that sense the weight of the fluid; manipulating a plurality of lockouts located adjacent to corresponding load cells from a first position to a second position so that the lockouts remove at least a portion of the weight of the fluid from the plurality of load cells; moving the support housing (Continued)

containing the collapsible bag with the fluid therein to a new location; and further manipulating the plurality of lockouts from the second position back to the first position so that the plurality of load cells again sense the full weight of the fluid within the collapsible bag.

24 Claims, 23 Drawing Sheets

(51) Int. Cl.
*G01G 19/22* (2006.01)
*G01L 1/26* (2006.01)
*G01G 17/00* (2006.01)
*G01G 19/12* (2006.01)

(56) References Cited

U.S. PATENT DOCUMENTS

| | | | | |
|---|---|---|---|---|
| 4,515,232 A * | 5/1985 | Rubinstein | | G01G 3/1412 |
| | | | | 177/154 |
| 4,905,780 A * | 3/1990 | Goff, III | | G01G 17/08 |
| | | | | 177/136 |
| 5,340,261 A | 8/1994 | Oosawa et al. | | |
| 5,369,222 A * | 11/1994 | Strelioff | | G01G 19/10 |
| | | | | 177/136 |
| 5,393,936 A * | 2/1995 | Tyhy | | G01G 19/12 |
| | | | | 177/138 |
| 5,635,680 A * | 6/1997 | Dojan | | G01G 19/08 |
| | | | | 177/136 |
| 5,835,982 A * | 11/1998 | Lanaro | | G01G 17/04 |
| | | | | 141/101 |
| 5,923,000 A * | 7/1999 | Tschopp | | G01G 23/005 |
| | | | | 177/154 |
| 6,119,475 A | 9/2000 | Murray et al. | | |
| 6,134,896 A * | 10/2000 | Brown | | B60H 1/00585 |
| | | | | 141/83 |
| 6,293,160 B1 | 9/2001 | Shigemoto | | |
| 6,774,808 B1 | 8/2004 | Hibbs et al. | | |
| 7,166,809 B2 * | 1/2007 | Desire | | G01G 23/02 |
| | | | | 177/154 |
| 7,276,097 B2 | 10/2007 | Edo | | |
| 7,384,783 B2 | 6/2008 | Kunas et al. | | |
| 7,487,688 B2 | 2/2009 | Goodwin | | |
| 7,682,067 B2 | 3/2010 | West et al. | | |
| 7,854,130 B2 * | 12/2010 | Brown | | B60H 1/00585 |
| | | | | 62/149 |
| 7,857,398 B2 | 12/2010 | Spadaccini et al. | | |
| 8,079,226 B2 * | 12/2011 | Brown | | B60H 1/00585 |
| | | | | 62/149 |
| 8,122,731 B2 * | 2/2012 | McMasters | | B60H 1/00585 |
| | | | | 62/292 |
| 8,272,228 B2 * | 9/2012 | Murray | | B60H 1/00585 |
| | | | | 62/149 |
| 8,572,992 B2 * | 11/2013 | Murray | | B60H 1/00585 |
| | | | | 62/149 |
| 8,590,335 B2 * | 11/2013 | Brown | | B60H 1/00585 |
| | | | | 62/149 |
| 8,616,011 B2 * | 12/2013 | Brown | | B60H 1/00585 |
| | | | | 62/292 |
| 8,661,836 B2 * | 3/2014 | Murray | | B60H 1/00585 |
| | | | | 62/149 |
| 8,661,839 B2 * | 3/2014 | McMasters | | B60H 1/00585 |
| | | | | 62/114 |
| 2006/0229570 A1 | 10/2006 | Lovell et al. | | |
| 2006/0240546 A1 | 10/2006 | Goodwin et al. | | |
| 2006/0266768 A1 * | 11/2006 | O'Leary | | B67D 7/0288 |
| | | | | 222/81 |
| 2006/0270036 A1 | 11/2006 | Goodwin et al. | | |
| 2008/0025823 A1 | 1/2008 | Harumoto | | |
| 2011/0188928 A1 | 8/2011 | West et al. | | |
| 2011/0310696 A1 | 12/2011 | Goodwin et al. | | |
| 2014/0144714 A1 | 5/2014 | Kjar | | |

OTHER PUBLICATIONS

Mettler Toledo 0958 Flexmount, *Accurate, Reliable Weighing for Static Tank Scales*, published at least as early as Aug. 2012.
*ThermoScientific HyClone Single-Use Bioreactor (S.U.B.) User's Guide*, Revision 11, Oct. 29, 2010.

* cited by examiner

LOAD CELL OVERLOAD PROTECTION BY A RELIEVING MECHANISM FOR FLUID DISPENSING SYSTEMS

BACKGROUND OF THE INVENTION

1. The Field of the Invention

The present invention relates to lockouts for load cell assemblies and fluid dispensing systems incorporating such load cell assemblies and lockouts.

2. The Relevant Technology

A load cell is a transducer that converts an applied force into a measurable electrical output. In turn, the electrical output can be used to calculate the applied force, such as the weight of an object. More specifically, a load cell includes one or more strain gauges through which an electrical current passes. When a force is applied to the load cell, the strain gauges deform which changes the electrical resistance produced by the strain gauges. The change in resistance is sensed by a central processing unit (CPU) which, by applying an algorithm, can calculate the force being applied.

Load cells are commonly used in a variety of different applications for measuring variable weight loads. For example, in the biopharmaceutical area, load cells are commonly used in association with containers used to produce cell culture media. The media is formed by mixing within a container predefined proportions of a powdered component and water. Because the media is often made as a large batch that is greater than 250 liters, load cells are associated with the container for measuring by weight the desired amount of water needed to produce the media. Once the proper amount of water has been delivered into the container, as determined by the load cells, the powder component can be added and then mixed with the water to form the media.

Depicted in FIG. 1 is one embodiment of a load cell assembly 10 commonly used in measuring the weight of a container 28 used to produce media. Load cell assembly 10 comprises a load cell 12, in the form of a load cell beam, having a first end 14 and an opposing second end 16. Load cell 12 is disposed between an upper support 19 and a lower support 18. Lower support 18 comprises a base plate 20 and a riser 22 disposed on base plate 20. First end 14 of load cell 12 is mounted on riser 22 so that second end 16 cantilevers over base plate 20. As depicted in FIG. 2, a transfer rod 24 extends between second end 16 of load cell 12 and upper support 19. Transfer rod 24 is used to transfer the entire load applied by upper support 19 onto second end 16 of load cell 12. FIG. 1 shows an annular seal 26 that encircles transfer rod 24 and is disposed between upper support 19 and load cell 12. Upper support 19 is secured to the floor of container 28.

During operation, the weight of container 28 is transferred to second end 16 of load cell 12 by passing through transfer rod 24. The resulting strain applied to load cell 12 is converted to an electrical signal which is transferred by an electrical cable 32 to a central processing unit (CPU) 33. In turn, by using the known weight of container 28, CPU 33 can calculate the weight and/or volume of fluid added to container 28.

Load cell assembly 10 also includes an anti-uplift bolt 34. Anti-uplift bolt 34 includes a bolt shaft 35 having a first end 36 with an enlarged head 38 formed thereat and an opposing second end 40. During assembly, second end 40 is freely passed down through a hole in upper support 19 and is then threaded into lower support 18. Anti-uplift bolt 34 secures upper support 19 to lower support 18 and thus prevents tilting or potential toppling of container 28. Anti-uplift bolt 34 can also be used for un-weighting load cell 12 when container 28 is empty. The un-weighting of load cell 12 enables container 28 to be serviced without risk of potential damage to load cell 12. Un-weighting load cell 12 is accomplished by tightening a first nut 42 against base plate 20 so that anti-uplift bolt 34 is rigidly fixed in place. A second nut 44 can then be threaded up bolt shaft 35 so as to push upper support 19 towards head 38. Second nut 44 is then repeatedly rotated about bolt 34 until the entire load applied by container 28 is transferred through bolt shaft 35 as opposed to through load cell 12. One example of load cell assembly 10 is the 0958 FLEXMOUNT® weight module provided by Mettler Toledo.

Although the prior art load cell assembly 10 functions for its intended purpose, it has a number of shortcomings. For example, second nut 44 on anti-uplift bolt 34 is located directly between supports 18 and 19 making it difficult to access. This inconvenience of location is compounded by the fact that the nut is small and often requires multiple turns to un-weight the load cell. Furthermore, anti-uplift bolt 34 is only designed to un-weight the load cell when the container is empty. The friction between second nut 44 on anti-uplift bolt 34 when the weight of the fluid is transferred onto the nut 22 makes it impractical to un-weight the load cell when the container is full of fluid. In addition, anti-uplift bolt 34 is so small that it would bend or otherwise fail if subject to a heavy load.

Accordingly, what is needed in the art are improvements to conventional load cell assemblies that solve all or some of the above shortcomings.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope. In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element; while the element label will include an appended letter (e.g., "20a") to refer to a specific instance of the element.

DETAILED DESCRIPTION OF THE PREFERRED EMBODIMENTS

As used in the specification and appended claims, directional terms, such as "top," "bottom," "left," "right," "up," "down," "upper," "lower," "proximal," "distal" and the like are used herein solely to indicate relative directions and are not otherwise intended to limit the scope of the invention or claims.

The present invention relates to lockouts for load cells and to fluid dispensing systems incorporating such lockouts and load cells. The fluid dispensing systems will commonly be used in the biopharmaceutical industry for preparing and dispensing solutions or suspensions. The systems can be commonly used as bioreactors or fermentors for culturing cells or microorganisms. The systems can also be used in association with the formation and/or treatment and dispensing of solutions and/or suspensions that are for biological purposes, such as media, buffers, or reagents. The systems can further be used for mixing and/or preparing and dispensing other types of solutions or suspensions that are not for biological purposes such as chemicals or food products.

Figure 3:
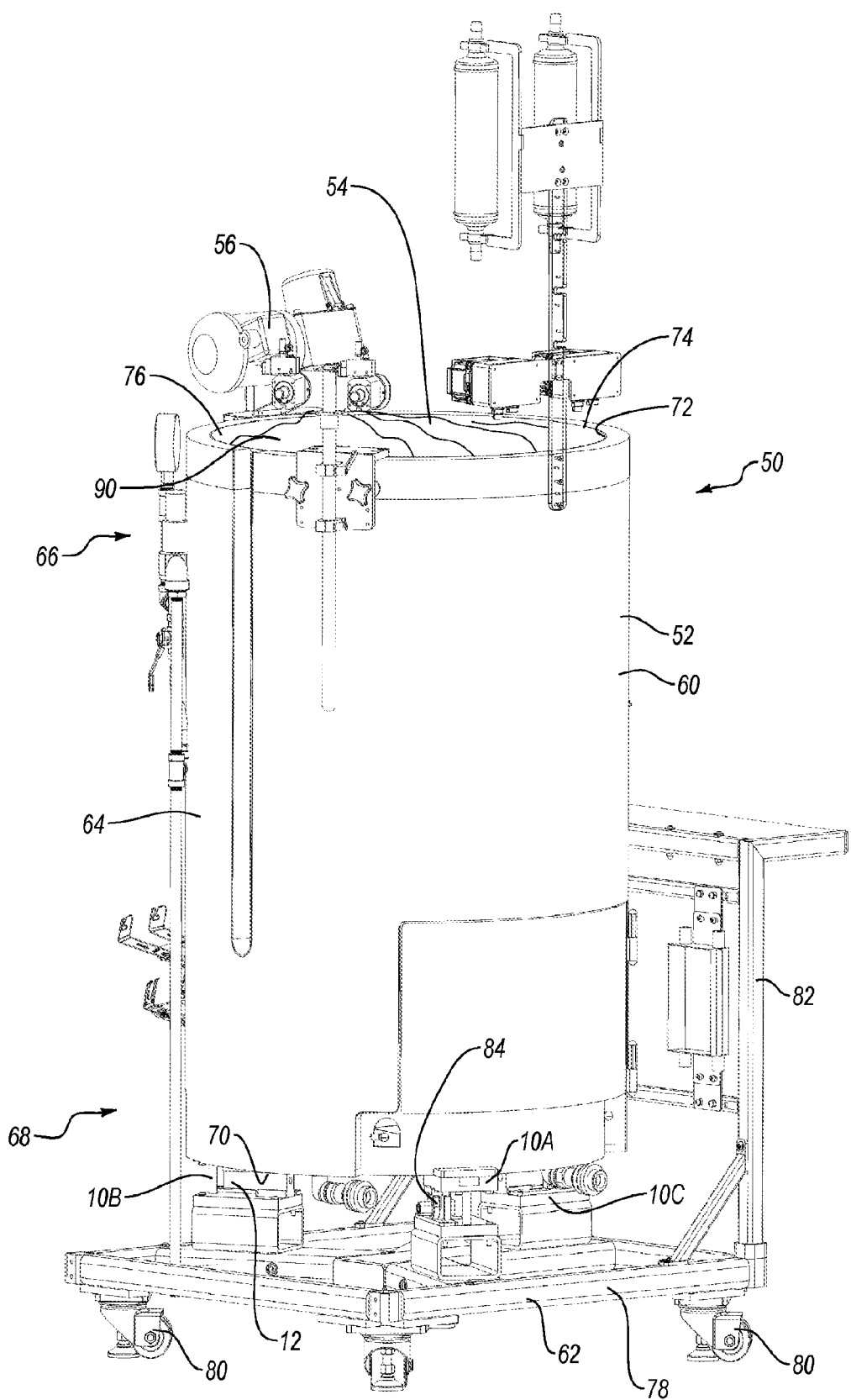
FIG. 3 is a perspective view of a fluid dispensing system incorporating features of the present invention.

Depicted in FIG. 3 is one embodiment of an inventive fluid dispensing system 50 incorporating features of the present invention. In general, fluid dispensing system 50 comprises a container station 52, a container assembly 54 that is supported by container station 52, a drive motor assembly 56 mounted on container station 52, and a drive shaft 58 (FIG. 5) that extends between drive motor assembly 56 and container assembly 54. Container assembly 54 houses the fluid that is dispensed. The various components of fluid dispensing system 50 will now be discussed in greater detail.

Continuing with FIG. 3, container station 52 comprises a support housing 60, a base 62 and three spaced apart load cell assemblies 10A-C, as previously discussed, that support housing 60 on base 62. As a result, load cell assemblies 10A-C cumulatively interact to measure the total weight of support housing 60 and the other equipment and fluid that are supported thereon. As will be discussed below in greater detail, a load cell lockout 84 couples with each load cell assembly 10 and functions to selectively remove the load being applied to each load cell 12 so that fluid dispensing system 50 can be freely moved without risk of damage to load cell 12.

Support housing 60 has a substantially cylindrical sidewall 64 that extends between an upper end 66 and an opposing lower end 68. Lower end 68 has a floor 70 mounted thereto. As a result, support housing 60 has an interior surface 72 that bounds a chamber 74. An opening 76 is formed at upper end 66 that provides access to chamber 74. As discussed below, support housing 60 is configured to receive and support container assembly 54 within chamber 74.

Although support housing 60 is shown as having a substantially cylindrical configuration, in alternative embodiments support housing 60 can have any desired shape capable of at least partially bounding a chamber. For example, sidewall 64 need not be cylindrical but can have a variety of other transverse, cross sectional configurations such as polygonal, elliptical, or irregular. Furthermore, it is appreciated that support housing 60 can be scaled to any desired size. For example, it is envisioned that support housing 60 can be sized so that chamber 74 can hold a volume of less than 50 liters, more than 1,000 liters or any of the other volumes or range of volumes as discussed below with regard to container assembly 54. Chamber 74 can commonly hold a volume greater than 40 liters. Support housing 60 can be jacketed so that a heated or cooled fluid can circulate through sidewall 64 to control the temperature of the fluid within container assembly 54. Support housing 60 can also be formed with any number and configuration of doors, windows, and/or passages so that container assembly 54 and the tubes and ports extending therefrom can be received and processed within support housing 60.

In the depicted embodiment, base 62 is in the form of a cart having a platform 78, wheels 80 and a handle 82 so that support housing 60 can be easily moved around. In alternative embodiments, the cart can come in a variety of different configurations. In other embodiments, base 62 can be in the form of a pallet or any other type of movable or fixed structure on which load cell assemblies 10 can rest. In some embodiments, base 62 can comprise a plurality of different structures on which one or more separate load cell assemblies 10 can be positioned. The number of different structures can vary based on the number of different load cell assemblies used. In still other embodiments, base 62 can be eliminated and the load cell assemblies 10 can rest directly on a floor.

Figure 4:
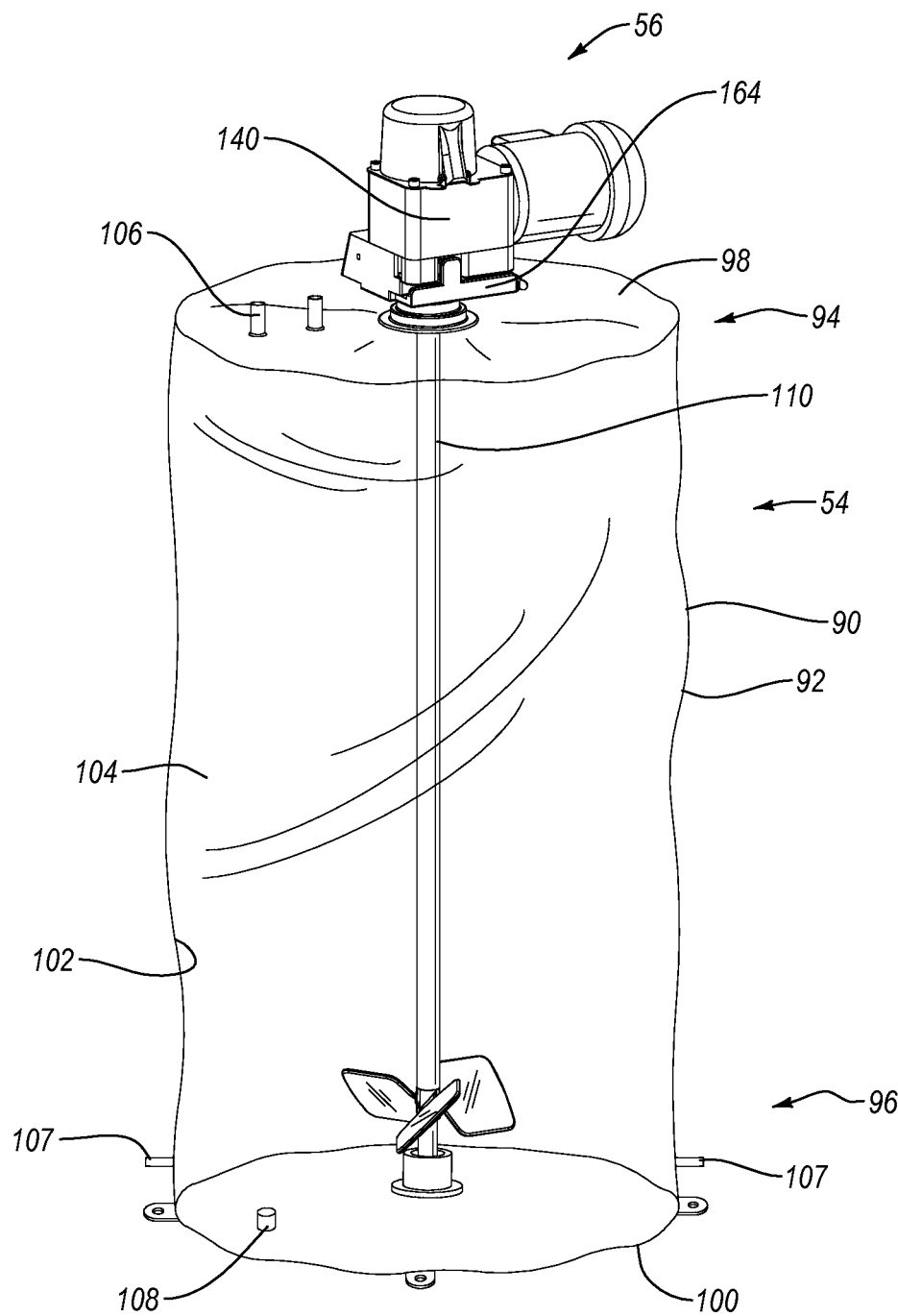
FIG. 4 is a perspective view of the container assembly and drive motor of the fluid dispensing system shown in FIG. 3.

As depicted in FIG. 4, container assembly 54 comprises a container 90 having a side 92 that extends from an upper end 94 to an opposing lower end 96. Upper end 94 terminates at an upper end wall 98 while lower end 96 terminates at a lower end wall 100. Container 90 also has an interior surface 102 that bounds a compartment 104. Compartment 104 is configured to hold a fluid. In the embodiment depicted, container 90 comprises a flexible bag that is comprised of a flexible, water impermeable material such as a low-density polyethylene or other polymeric sheets having a thickness in a range between about 0.1 mm to about 5 mm with about 0.2 mm to about 2 mm being more common. Container 90 can comprise a two-dimensional pillow style bag or a three-dimensional bag that are formed from one or more sheets welded together.

It is appreciated that container 90 can be manufactured to have virtually any desired size, shape, and configuration. For example, container 90 can be formed having compartment 104 sized to 10 liters, 30 liters, 50 liters, 100 liters, 250 liters, 500 liters, 750 liters, 1,000 liters, 1,500 liters, 3,000 liters, 5,000 liters, 10,000 liters or other desired volumes. The size of compartment 104 can also be in the range between any two of the above volumes. Although container 90 can be any shape, in one embodiment container 90 is specifically configured to be generally complementary to chamber 74 of support housing 60 in which container 90 is received so that container 90 is properly supported within chamber 74.

Although in the above discussed embodiment container 90 is in the configuration of a flexible bag, in alternative embodiments it is appreciated that container 90 can comprise any form of collapsible container or semi-rigid container.

Continuing with FIG. 4, formed on container 90 are a plurality of ports 106 at upper end 98, a plurality of ports 107 on opposing sides of side 92 at lower end 96, and a port 108 on lower end wall 100. Each of ports 106-108 communicate with compartment 104. Although only a few ports 106-108 are shown, it is appreciated that container 90 can be formed with any desired number of ports 106-108 and that ports 106-108 can be formed at any desired location on container 90. Ports 106-108 can be the same configuration or different configurations and can be used for a variety of different purposes. For example, ports 106-108 can be coupled with fluid lines for delivering fluids and components into container 90 and withdrawing fluid from container 90. Ports 106-108 can also be used for delivering gas to container 90, such as through a sparger, and withdrawing gas from container 90.

Ports 106-108 can also be used for coupling probes and/or sensors to container 90. For example, when container 90 is used as a bioreactor or fermentor for growing cells or microorganisms, ports 106-108 can be used for coupling probes such as temperatures probes, pH probes, dissolved oxygen probes, dissolved $CO_2$ probes, and the like. Various optical sensors and other types of sensors can also be attached to ports 106-108. Ports 106-108 can also be used for coupling container 18 to secondary containers, to condenser systems, and to other desired fittings. Examples of ports 106-108 and how various probes, sensors, and lines can be coupled thereto is disclosed in United States Patent Publication No. 2006-0270036, published Nov. 30, 2006 and United States Patent Publication No. 2006-0240546, published Oct. 26, 2006, which are incorporated herein in their entirety by specific reference.

Figure 5:
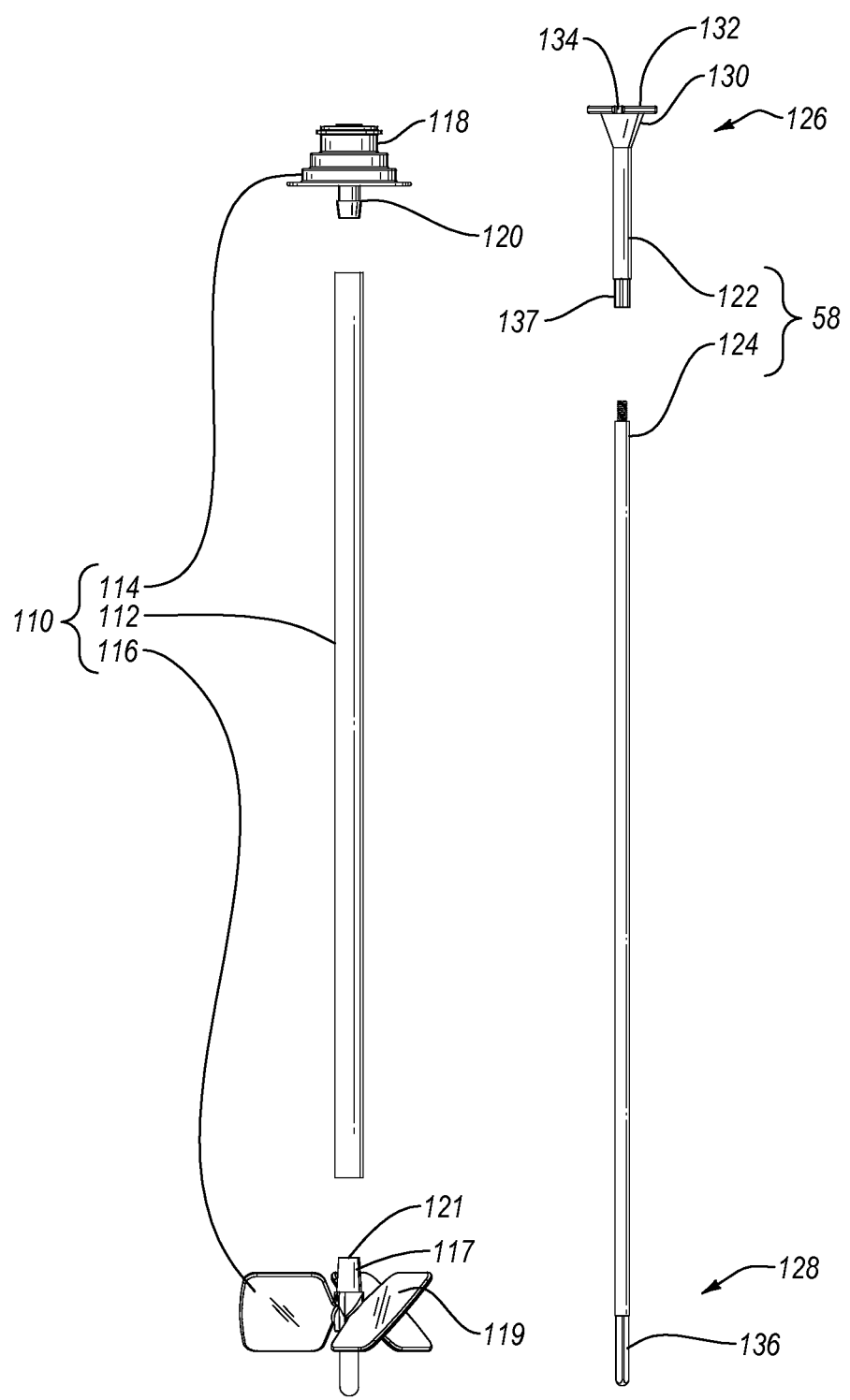
FIG. 5 is an elevated side view of the impeller assembly and drive shaft of the fluid dispensing system shown in FIG. 3.

As shown in FIG. 4, container assembly 54 further comprises an impeller assembly 110. As depicted in FIG. 5, impeller assembly 110 comprises an elongated tubular connector 112 having a rotational assembly 114 mounted at one end and an impeller 116 mounted on the opposing end. In one embodiment, tubular connector 112 comprises a flexible tube such as a polymeric tube. In other embodiments, tubular connector 112 can comprise a rigid tube or other tubular structure. Rotational assembly 114 comprises an outer casing 118 and a tubular hub 120 that rotates within outer casing 118. Bearings and seals can be disposed between hub 120 and outer casing 118 to facilitate easy rotation of hub 120 relative to casing 118 while an aseptic seal formed therebetween. Outer casing 118 is secured to upper end wall 98 of container 90 while hub 120 is received within and secured to the end of tubular connector 112. In the assembled configuration, tubular connector 112 and impeller 116 extend into or are disposed within compartment 104 of container 90 (FIG. 4).

Impeller 116 comprises a central hub 117 having a plurality of blades 119 radially outwardly projecting therefrom. A blind socket 121 is formed on hub 117 and has a polygonal transverse cross section. As discussed below, socket 121 is configured to receive a driver for selective rotation of impeller 116.

As also depicted in FIG. 5, impeller assembly 110 is used in conjunction with drive shaft 58. In general drive shaft 58 comprises a head section 122 and a shaft section 124 that can be coupled together by threaded connection or other techniques. Drive shaft 58 has a first end 126 and an opposing second end 128. Formed at first end 126 is a frustoconical engaging portion 130 that terminates at a circular plate 132. Notches 134 are formed on the perimeter edge of circular plate 132 and are used for engaging drive shaft 58 with drive motor assembly 56 as will be discussed below.

Formed at second end 128 of drive shaft 58 is driver portion 136. Driver portion 136 has a non-circular transverse cross section so that it can facilitate locking engagement within hub 117 of impeller 116. In the embodiment depicted, driver portion 136 has a polygonal transverse cross section. However, other non-circular shapes can also be used. A driver portion 137 is also formed along drive shaft 58 toward first end 126. Driver portion 137 also has a non-circular transverse cross section and is positioned so that it can facilitate locking engagement within hub 120 of rotational assembly 114.

During use, drive shaft 58 is advanced down through hub 120 of rotational assembly 114, through tubular connecter 112 and into hub 117 of impeller 116. As a result of the interlocking engagement of driver portions 136 and 137 with hubs 117 and 120, respectively, rotation of drive shaft 58 by drive motor assembly 56 facilitates rotation of hub 120, tubular connecter 112 and impeller 116 relative to outer casing 118 of rotational assembly 114. As a result of the rotation of impeller 116, fluid within container 90 is mixed.

It is appreciated that impeller assembly 40, drive shaft 58 and the discrete components thereof can have a variety of different configuration and can be made of a variety of different materials. Alternative embodiments of and further disclosure with respect to support housing 60, container assembly 54, impeller assembly 40, drive shaft 362, and the components thereof are disclosed in U.S. Pat. No. 7,384,783, issued Jun. 10, 2008; US Patent Publication No. 2011/0188928, published Aug. 4, 2011; and US Patent Publication No. 2011/0310696, published Dec. 22, 2011 which are incorporated herein in their entirety by specific reference.

Figure 6:
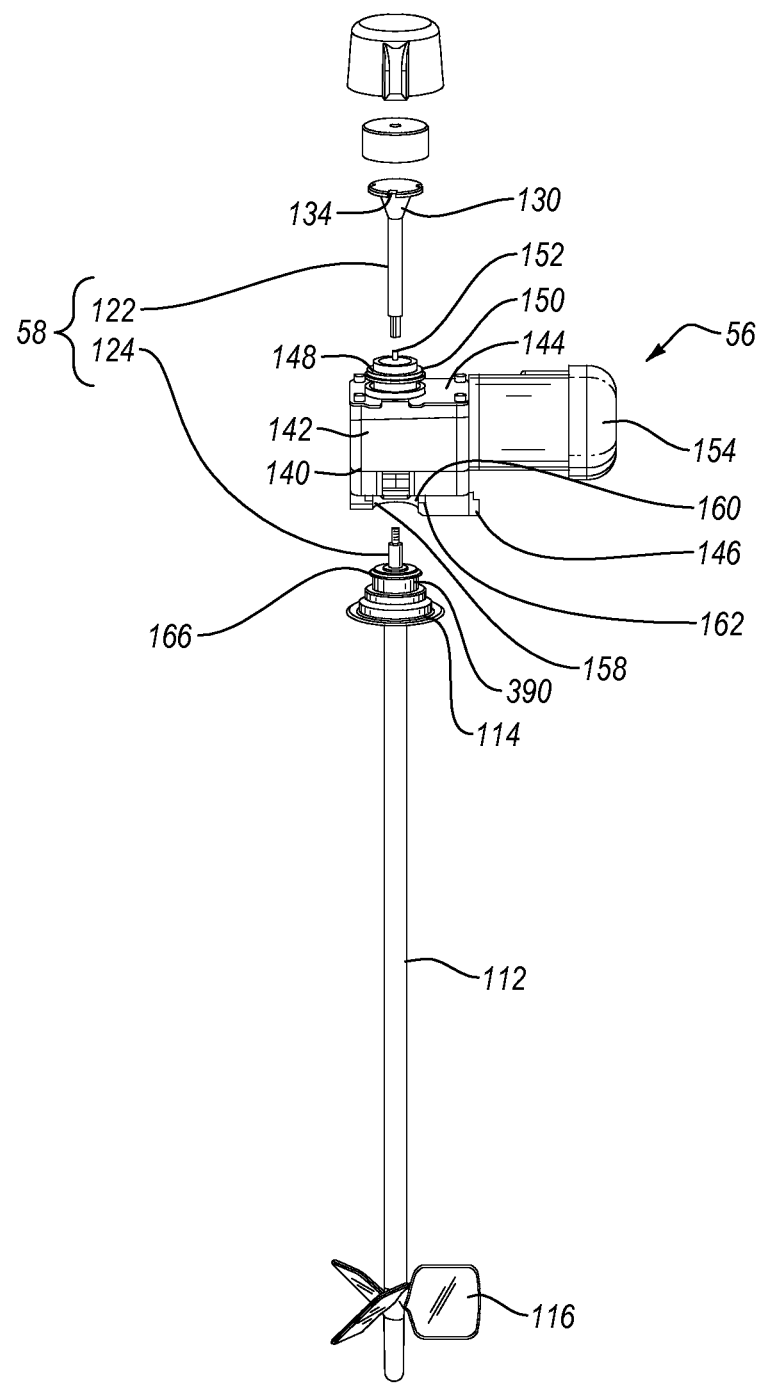
FIG. 6 is an exploded perspective view of the impeller assembly, drive shaft, and drive motor of the fluid dispensing system shown in FIG. 3.

Turning to FIG. 6, drive motor assembly 56 comprises a housing 140 having a front face 142 that extends from a top surface 144 an opposing bottom surface 146. An opening 148 extends through housing 140 from top surface 144 to bottom surface 146. A tubular motor mount 150 is rotatably secured within opening 148 of housing 140. Upstanding from motor mount 150 is a locking pin 152. A drive motor 154 is mounted to housing 140 and engages with motor mount 150 so as to facilitate select rotation of motor mount 150 relative to housing 140. Drive shaft 58 is configured to pass through motor mount 150 so that engaging portion 130 of drive shaft 58 is retained within motor mount 150 and locking pin 152 of motor mount 150 is received within notch 134 of drive shaft 58. As a result, rotation of motor mount 150 by drive motor 154 facilitates rotation of drive shaft 58. Further discussion of drive motor assembly 56 and how it engages with drive shaft 58 and alternative designs of drive motor assembly 56 are discussed in US Patent Publication No. 2011/0188928 which is incorporated herein by specific reference.

As also depicted in FIG. 6, housing 140 of drive motor assembly 56 has a U-shaped receiving slot 158 that is recessed on a front face 142 and bottom surface 146 so as to communicate with opening 148 extending through housing 140. Receiving slot 158 is bounded by an inside face 160 on which a U-shaped catch slot 162 is recessed. As shown in FIG. 4, a door 164 is hingedly mounted to housing 140 and selectively closes the opening to receiving slot 158 from front face 142. As depicted in FIG. 6, to facilitate attachment of rotational assembly 114 to housing 140, door 164 is rotated to an open position and rotational assembly 114 is horizontally slid into receiving slot 158 from front face 142 of housing 140 so that a mounting flange 166 of rotational assembly 114 is received within catch slot 162. Rotational assembly 114 is advanced into receiving slot 158 so that the opening extending through rotational assembly 114 aligns with the passage extending through motor mount 150. In this position, door 164 is moved to the closed position and secured in place by a latch or other locking mechanism so that rotational assembly 114 is locked to drive motor assembly 56.

During use, container assembly 54 (FIG. 4) is positioned within chamber 74 of support housing 60 and rotational assembly 114 is secured to drive motor assembly 56, as discussed above. Drive shaft 58 can then be advanced down through drive motor assembly 56 and into impeller assembly 110 so as to engage impeller 64 and motor mount 150. Prior to or after drive shaft 58 is properly positioned, a fluid can be delivered into container 90. Components such as powders, nutrients, additives, cells, microorganisms and others can also be added into container 90. As previously mentioned, examples of fluids that can be delivered into or prepared within container 90 include water, media, buffers, reagents and cultures of cells and microorganisms. Others fluids such as chemicals, beverages, food products and the like can also be delivered into or prepared within container 90. Where container 90 is functioning as a bioreactor or fermentor, cells or microorganisms along with nutrients and other standard components can be added to container 90. Before or after adding the different components, drive motor assembly 56 can activated causing drive shaft 58 to rotate impeller 116 and thereby mix or suspend the fluid within container 90. Once the processing of the fluid is complete, a drain line connected to one of ports 106-108 can be used to dispense fluid from container 90. The dispensing can be accomplished either through gravity feed or with the assistance of a pump.

In contrast to using impeller assembly 110, it is appreciated that there are a variety of other ways to mix the fluid within container 90. For example, drive shaft 58 can project directly into container 90 with an impeller fixed to the end of drive shaft 58. A dynamic seal can be used to rotatably seal drive shaft 58 to container 90. A drive motor can then rotate drive shaft 58 from outside of container 90. In other embodiments, a magnetic impeller can be housed within container 90 while a magnetic driver located outside of container 90 can be used to rotate the magnetic impeller. The above discussed methods of mixing fluid within container 90 are examples of different means for mixing fluid within container 90. Other methods such as by swiveling, pivoting or vertically raising and lowering a mixing element within container 90 can also be used.

Figure 1:
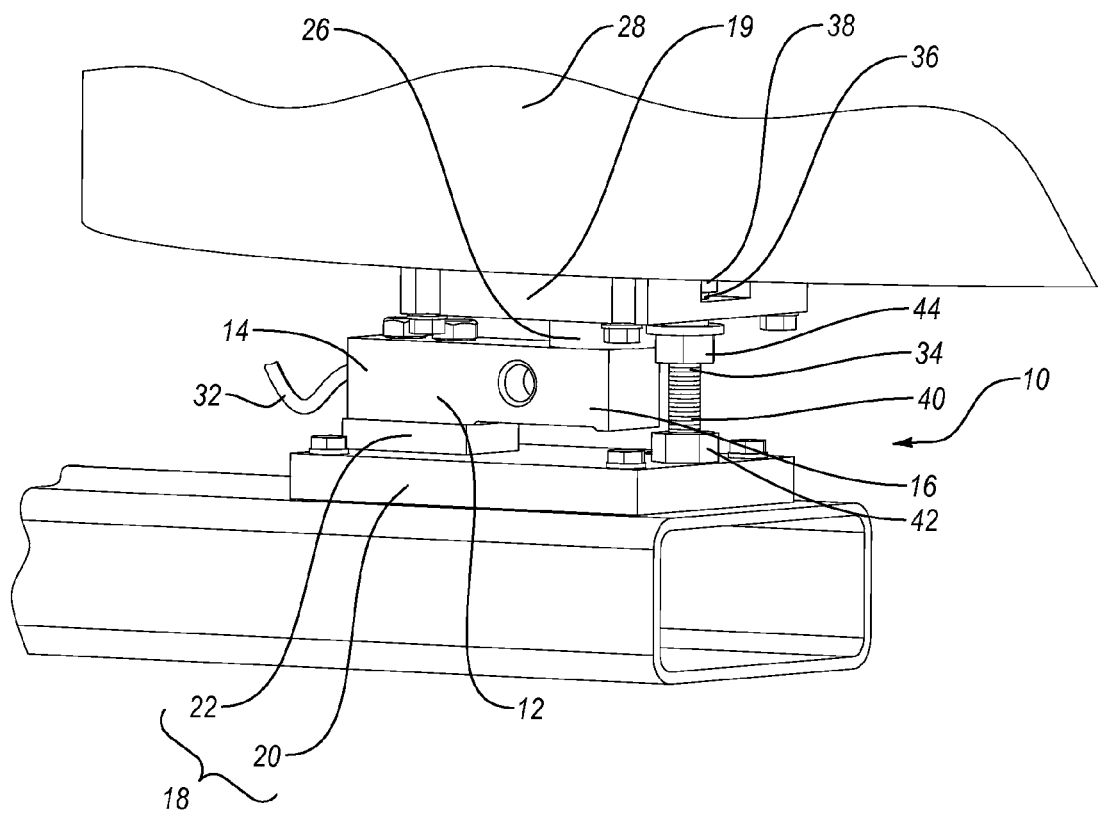
FIG. 1 is a perspective view of a prior art load cell assembly.

Returning again to FIG. 3, load cell assemblies 10 can be used in a number of different situations. For example, when preparing solutions such as a media, buffer or reagents, the amount of water needed for a specific batch size can be determined by first dispensing water into container 90 which is supported within support housing 60 until CPU 33 coupled with load cell assemblies 10 (FIG. 1) senses or displays that the desired volume of water has been added based on the weight of the water. The other components, such as powders, can then be added. The water and other components can then be mixed to produce the final solution. The various components can either be pre-weighed prior to combining with the water or load cell assemblies 10 can be used to measure the amount by weight of the different components. The same process can be used for biological fluids, chemicals, beverages, food products and other solutions where one or more of the components are added by weight. Likewise, when fluid dispensing system 50 is being used as a bioreactor or fermentor, load cell assemblies 10 can be used to measure the amount of media and or other components that need to be added to container 90 for growing a culture of cells or microorganisms. Load cell assemblies 10 can be used in both the initial delivery of media and in adding subsequent amounts of media as a culture grows. The load cell assemblies 10 can also be used for dispensing fluid from container 90. For example, by using load cell assemblies 10 to measure the drop in weight of container assembly 54 as fluid is dispensed therefrom, the volume by weight of fluid dispensed can be calculated. Other uses are also applicable where weight is a factor.

Figure 2:
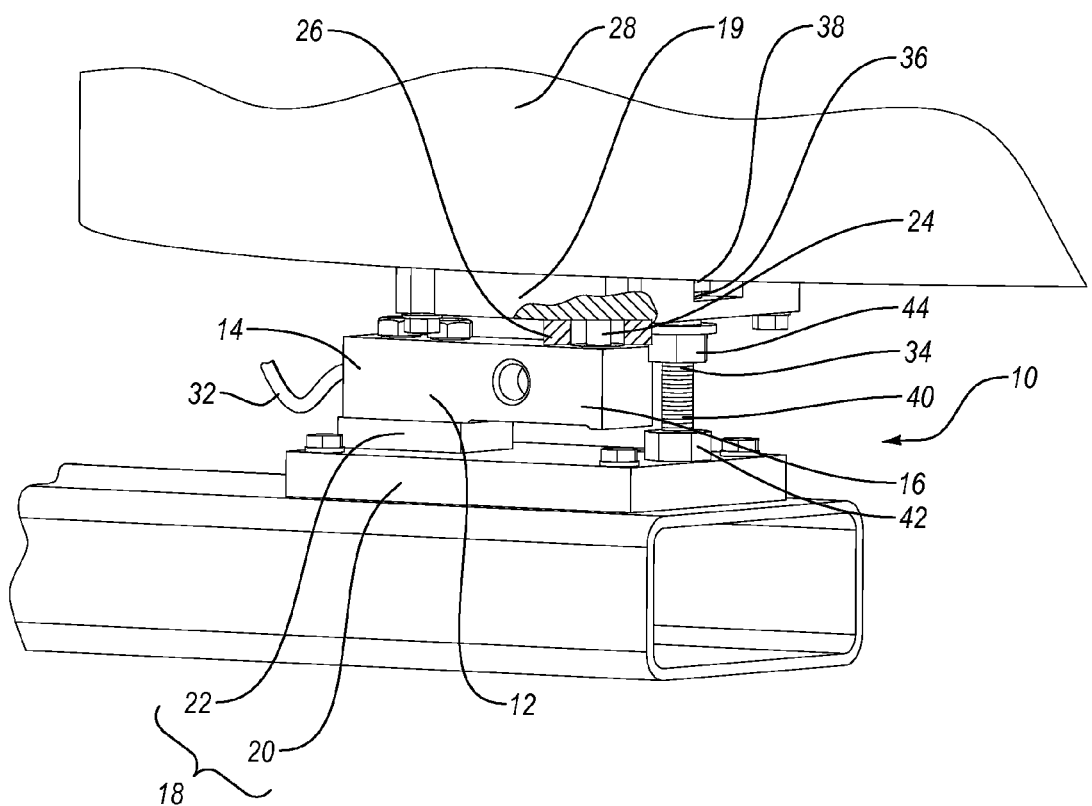
FIG. 2 is a partially cut away view of the load cell assembly shown in FIG. 1.

The load cell assembles can also have a variety of different configurations. For example, lower support 18 is depicted in FIG. 2 as comprising base plate 20 and riser 22. In alternative embodiments, base plate 20 can be eliminated. Riser 22 and anti-uplift bolt 34 can then be coupled directly to base 62 (FIG. 3) of container station 52. Riser 22 and base 62 can then form the lower support 18. Likewise, upper support 19 is shown in FIG. 2 as comprising a retainer that is mounted to container 28 and that retains transfer rod 24. In an alternative embodiment, the retainer can be eliminated. Transfer rod 24 and anti-uplift bolt 34 can then be coupled directly to the bottom of support housing 60 (FIG. 3). The bottom of support housing 60 can then comprise upper support 19. Other embodiments are also envisioned, including those discussed below.

As previously discussed, the present invention is primarily concerned with load cell lockouts that can be used with each load cell assembly 10. The load cell lockouts function to remove the load applied to load cells 12. The applied load can be produced by support housing 60, either independently or in combination with container assembly 54, the fluid contained within container assembly 54 and/or other components that are attached to or are supported on container assembly 54 or support housing 60. Removing the load from load cells 12 enables fluid delivery system 50 or parts thereof to be moved or worked on without risk of damaging load cells 12. For example, if fluid delivery system 50 is moved while containing fluid and without unloading load cells 12, sudden forces applied to load cells 12, as a result of the movement, can damage the load cells requiring their replacement.

Figure 7:
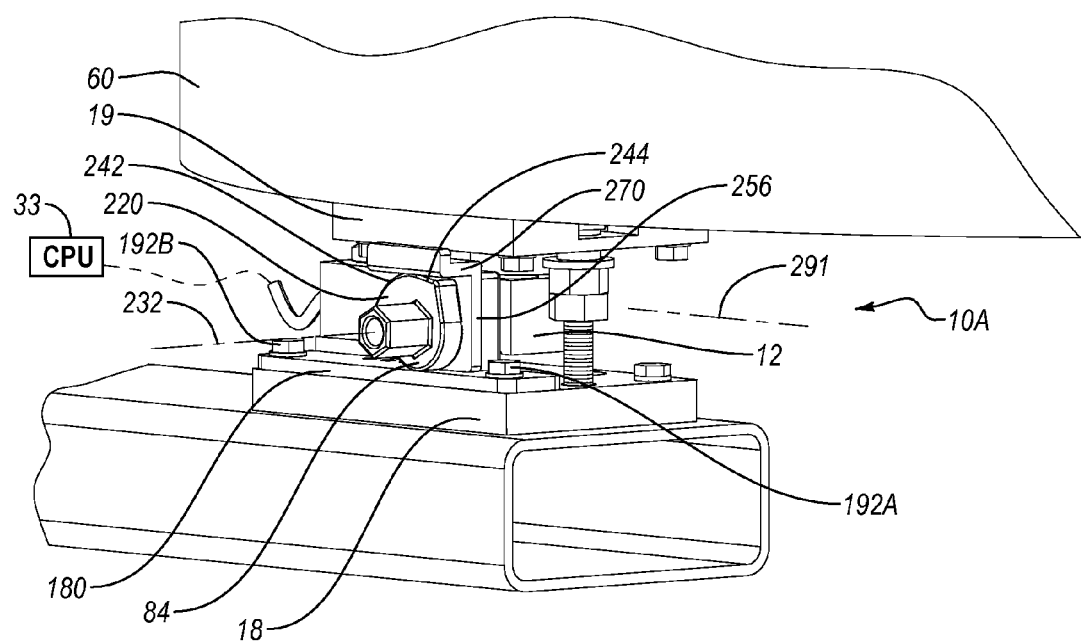
FIG. 7 is a perspective view of a load cell assembly and lockout of the fluid dispensing system shown in FIG. 3.
Figure 8:
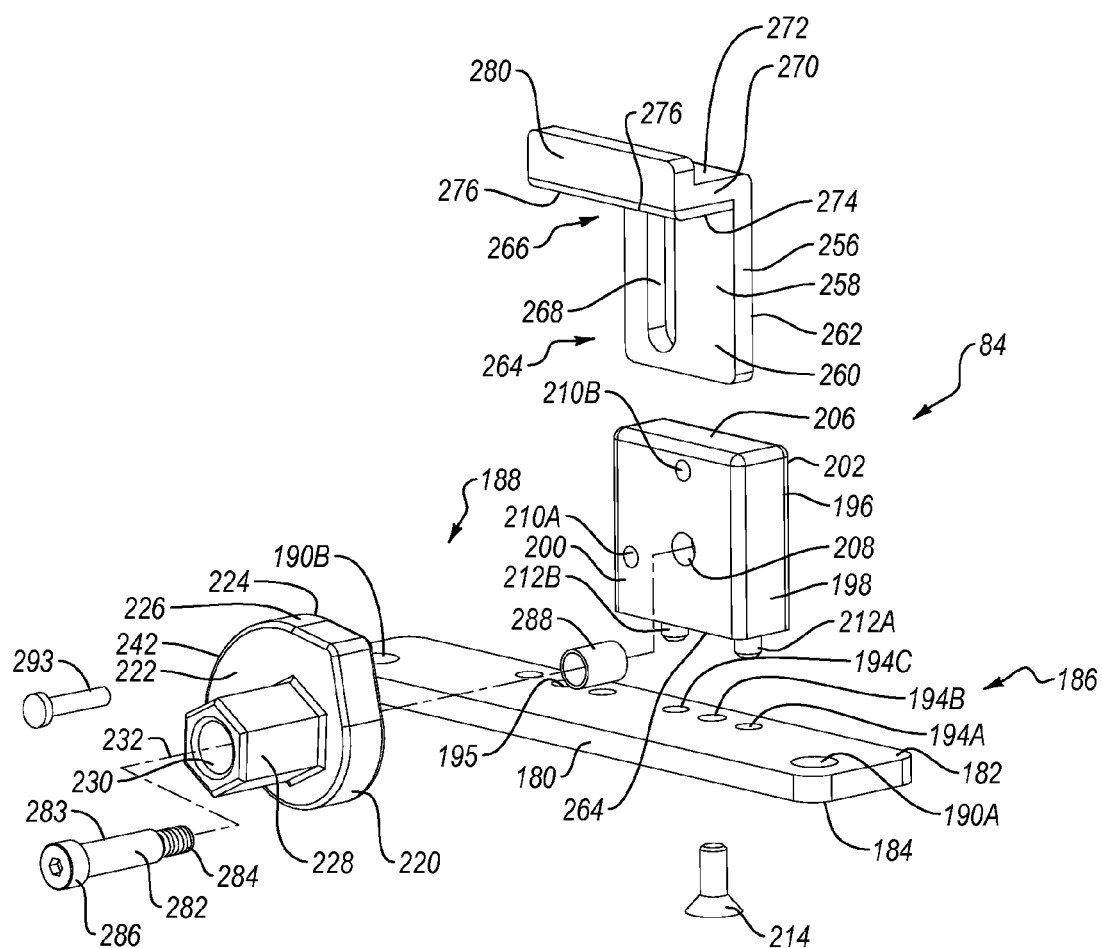
FIG. 8 is an exploded view of the lockout shown in FIG. 7.

Depicted in FIG. 7 is one embodiment of a load cell lockout 84 coupled with load cell assembly 10A. As depicted in FIG. 8, lockout 84 comprises an elongated mounting plate 180 having a top surface 182 and opposing bottom surface 184 that extend between a first end 186 and an opposing second end 188. Holes 190A and B extend through mounting plate 180 at opposing ends thereof. As depicted in FIG. 7, bolts 192A and B can be passed through holes 190A and B for securing mounting plate to the top surface of lower support 18 of load cell assembly 10. Also extending through mounting plate 120 is a plurality of spaced apart position holes 194. Lockout 84 further includes a stand 196 secured to mounting plate 180. Stand 196 comprises a base 198 having an essentially boxed-shaped configuration. Base 198 has a front face 200 and an opposing back face 202 that extend between a bottom face 204 and a top face 206. A threaded engagement hole 208 is formed on a central region of front face 200. A pair of spaced apart locking holes 210A and 210B are also formed on front face 200. Downwardly projecting from bottom surface 204 of base 198 are a pair of posts 212A and B. Posts 212A and B can be selectively received within position holes 194A and B while a bolt 214 can be passed up through central position hole 194B and threaded into base 198 so as to secure stand 196 to mounting plate 180. It is appreciated that any number of fastening techniques can be used to secure stand 196 to mounting plate 180. In this embodiment, a second set of positioning holes 195 is also formed on mounting plate 180. Stand 196 can be mounted on positioning holes 195 for location adjustment if needed. In other embodiments, stand 196 can be integrally formed as a single unit with mounting plate 180.

Lockout 84 further comprises a cam 220. Cam 220 has a front face 222 and an opposing back face 224 with a perimeter side edge 226 extending therebetween. Outwardly projecting from front face 222 is an engager 228. Engager 228 has a polygonal transverse cross section so that a wrench, ratchet with socket, or other tool can easily attach to engager 228 for selective rotation of cam 220. In other embodiments, a non-circular opening can be formed on front face 222 into with a complementary driver can be received for select rotation of cam 220. Engager 228, other engagers discussed herein and the non-circular opening are examples of means for selectively rotating cam 220. Other structures, such as a handle, can also be formed on cam 220 for selective rotation thereof. A mounting hole 230 passes through engager 228 and extends through cam 220 by passing between front face 222 and back face 224. A central longitudinal axis 232 passes through mounting hole 230.

Figure 9:
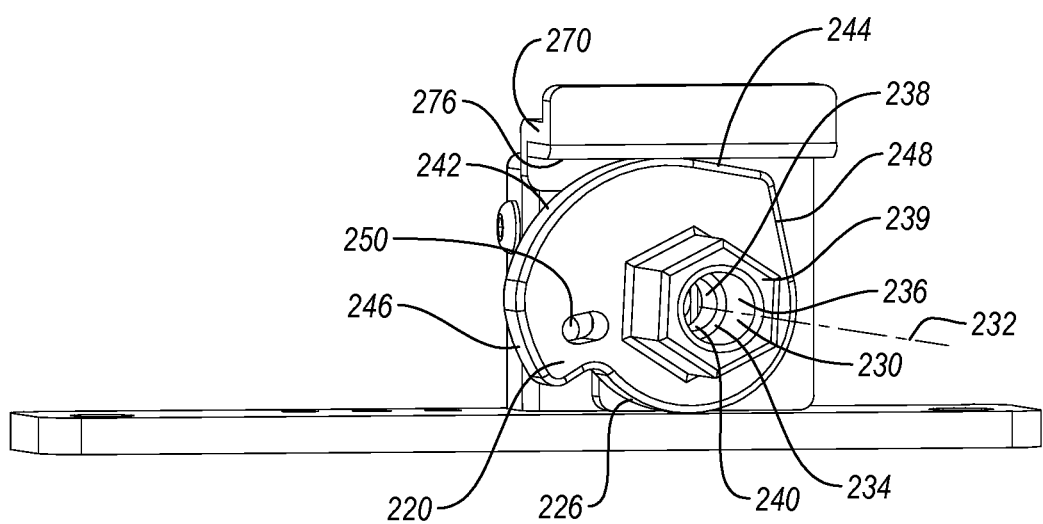
FIG. 9 is a perspective front view of the lockout shown FIG. 7 with the cam thereof in a first orientation.

As depicted in FIG. 9, mounting hole 230 is bounded by an interior surface 234. Interior surface 234 comprises a first portion 236 that extends in from an end face 239 and a concentrically disposed second portion 238 that extends from first portion 236 to back face 224 of cam 220. In the depicted embodiment, portions 236 and 238 both have a cylindrical configuration while second portion 238 has a small diameter than first portion 236. An annular shoulder 240 is formed between first portion 236 and second portion 238.

Perimeter side edge 226 of cam 220 has an eccentric configuration which in the present embodiment is non-symmetrical. Perimeter side edge 226 comprises an arched engaging surface 242 that extends from a first end 244 to an opposing second end 246. The arch of engaging surface 242 has a variable radius with the radius between central longitudinal axis 232 and second end 246 being longer than the radius between central longitudinal axis 232 and first end 244. The radius between central longitudinal axis 232 and engaging surface 242 can continuously increase for the majority of the length or the entire length between first end 244 and second end 246. However, in one embodiment the radius to a location between ends 244 and 246 can be longer than the radius to second end 246. Perimeter side edge 226 can also include a flat or substantially flat locking surface 248 formed adjacent to first end 244. A locking hole 250 passes through cam 220 between front face 222 and back face 224 at a location toward second end 246 of engaging surface 242.

Returning to FIG. 8, lockout 84 further comprises a lift 256. Lift 256 includes an elongated guide body 258 which, in the depicted embodiment, is in the form of a plate having a front face 260 and an opposing back face 262 that longitudinally extends from a first end 264 to an opposing second end 266. An elongated alignment slot 268 extends through body 258 from front face 260 to back face 262 and extends along the length of body 258 from first end 264 to second end 266. Outwardly projecting from front face 260 at second end 266 is a rest 270. Upwardly projecting from the end of rest 270 is an elongated catch lip 280.

Rest 270 is also depicted as being in the form of a plate having a top surface 272 and an opposing bottom contact surface 274. In the depicted embodiment, surfaces 272 and 274 are disposed parallel to each other and are both disposed perpendicular to front face 260 of guide body 258. In one embodiment, contact surface 274 is comprised of a layer 276 of a low friction material typically having a coefficient of friction in a range between about 0.05 and 0.2. The coefficient of friction is typically less than 0.2 and preferable less than 0.1. In one embodiment, layer 276 can be comprised of a material that has a coefficient of friction that is lower than the coefficient of friction of the material on which layer 276 is applied. Examples of materials that can be used for contact surface 274 include polytetrafluoroethylene (PTFE) which is commonly sold under the trademark TEFLON® and acetal which is commonly sold under the trademark DELRIN®. Other materials can also be used. The remainder of rest 270 along with catch lip 280 and guide body 258 can be comprised of a high strength material such as metal, composite, or a high strength polymer.

Lockout 84 further comprises an elongated bolt 282 having a shaft 283 with a threaded first end 284 and an enlarged head 286 disposed at an opposing second end. A cylindrical bushing 288 is configured to be received over shaft 283. During assembly, stand 196 is secured to mounting plate 180 as previously discussed. Lift 256 is disposed against front face 200 of stand 196 so that alignment slot 268 is aligned with engagement hole 208. Bushing 288 is received over bolt 282. First end 284 of bolt 282 is then advanced through mounting hole 230 of both engager 228 and cam 220, passed through alignment slot 268 on lift 256 and then threadedly secured within engagement hole 208 on stand 196. In this configuration, bushing 288 is received within second portion 244 of mounting hole 230 (FIG. 9) while enlarged head 286 of bolt 282 projects over shoulder 240 within mounting hole 230 so as to prevent cam 220 from pulling off of bolt 282. Back face 224 of cam 220 is disposed adjacent to front face 260 of lift 256 so that engaging surface 242 of cam 220 is disposed adjacent to contact surface 274 of lift 256.

As depicted in FIG. 7, the assembled lockout 84 is mounted on load cell assembly 10A by securing mounting plate 180 on lower support 18 so that rest 270 of lift 256 is disposed directly below upper support 19 of load cell assembly 10. In this position, central longitudinal axis 232 passing through engager 228 and cam 220 is perpendicular to a longitudinal axis 291 passing through load cell 12. Engager 228 thus outwardly projects from the side of load cell 12 so as to be openly exposed and easily accessed.

Lockout 84 can be selectively moved between a lowered first position and a raised second position. In the first position, as depicted in FIG. 9, cam 220 is in a first orientation so that contact surface 276 of rest 270 is disposed on first end 244 of engaging surface 242 of cam 220. In this position, lift 256 is spaced apart from upper support 19 of load cell assembly 10 (FIG. 7) so that all of the load being applied to upper support 19 from support housing 60 is transferred to load cell 12.

Figure 10:
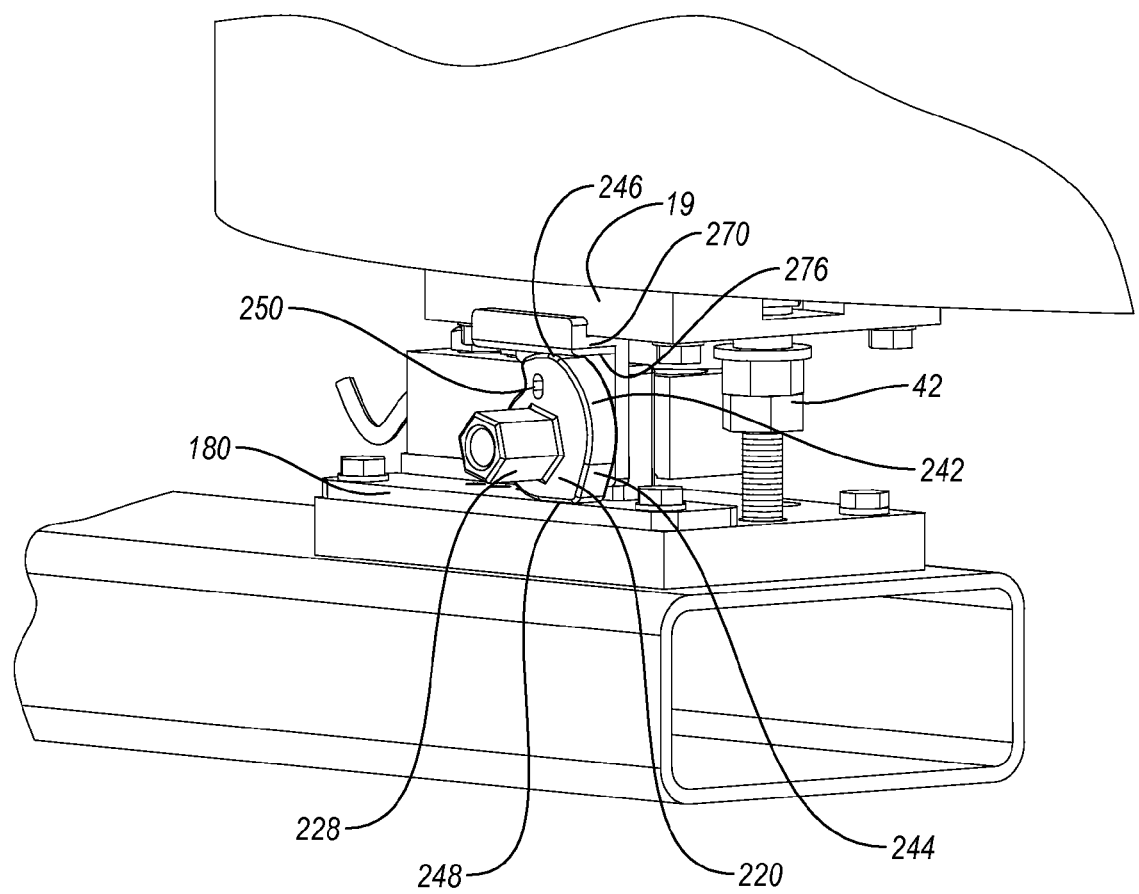
FIG. 10 is a perspective view of the load cell assembly and lockout shown in FIG. 7 with the cam in a second orientation.

By coupling a tool, such as a ratchet or wrench to engager 228, engager 228 can be selectively rotated so as to rotate cam 220 to a second orientation where contact surface 276 of rest 270 is disposed on second end 244 of engaging surface 242 of cam 220 as shown in FIG. 10. Cam 220 can be rotated over an angle between 30° to 300° with between 45° to 180° being more common. Other angles can also be used. Flat locking surface 248 sits against mounting plate 180 to stop further rotation of cam 220 when cam 220 reaches the second orientation. As cam 220 is rotated, engaging surface 242 slides against contact surface 274 of rest 270 from first end 244 to second end 246. Because of the increase in radius along engaging surface 242, engaging surface 242 biases against contact surface 274 of rest 270 so as to push rest 270 and the remainder of lift 256 upward relative to stand 196 so as to be in the second position. As lift 256 rises, lift 256 pushes against the bottom surface of upper support 19 of load cell assembly 10A so as to lift upper support 19 and support housing 60 thereon. As a result, all of the load being applied to upper support 19 from support housing 60 is now transferred through lockout 84 to lower support 18, thereby removing all of the load from load cell 12. In some embodiments or uses, it is appreciated that cam 220 can be configured to that a limited load is still applied through load cell 12 even when lockout 84 is in the second position.

When lockout 84 is in the first position, locking hole 250 on cam 220 (FIG. 9) is aligned with locking hole 210A on stand 196 (FIG. 8). A pin can then be removably inserted within aligned holes 250 and 210A to prevent unwanted rotation of cam 220. Likewise, in the second position locking hole 250 is aligned with locking hole 210B on stand 196. The pin can then be removably inserted within aligned holes 250 and 210B to prevent unwanted rotation of cam 220.

Lockout 84 has a number of benefits. For example, in the depicted embodiment engager 228 freely projects out from the side of load cell assembly 10A so that it is easily accessed with a tool for rotating cam 220. This is in contrast to nut 42 (FIG. 1) which is disposed between supports 18 and 19 and thus can be difficult to access. Furthermore, cam 220 need only be rotated less than 360° and more commonly less than 180° to completely unload load cell 12. This is substantially easier than having to make multiple rotations of nut 42 to unload load cell 12. Furthermore, as a result of engaging surface 242 riding against contact surface 276 which has a low coefficient of friction, cam 220 can be easily rotated to the second orientation even when container assembly 54 is full of fluid. Lockout 84 can thus be used both when support housing 60 is empty and when support housing 60 contains container assembly 54 full of fluid. In alternative embodiments, engaging surface 242 of cam 220 can also be comprised of a layer of a low friction material such as the material used for contact surface 276. In still other embodiments, engaging surface 242 can also be comprised of a layer of a low friction material while contact surface 276 does not include a layer of a low friction material.

Other lockouts having the same configuration as lockout 84 can be applied and used in the same manner with each of load cell assemblies 10B and 10C or however many load cell assemblies are used. Accordingly, by using lockouts 84, all or a desired portion of the load applied to load cells 12 can be selectively and easily removed from load cells 12 such as during initial or subsequent shipping of fluid dispensing system 50, during maintenance of fluid dispensing system 50, during movement of fluid dispensing system 50, such as within a facility, during storage or non-use of fluid dispensing system 50 and at other desired times so as to avoid or minimize damage to the load cells. In some embodiments, lockouts 84 are designed to remove between 30% to 95% and more commonly between 50% to 80% of the load applied to load cells 12. In other embodiments, all of the load is removed from load cells 12. When desired, lockouts 84 can then be easily moved to the lowered position so as to again activate the load cells 12.

It is appreciated that lockouts 84 can be used with any configuration of load cell assembly. Although load cell assembly 10 depicts a load cell beam for load cell 12, other types of load cells can also be used. In addition, the load cell need not be horizontally disposed but can also be disposed vertically or at and angle. For example, the load cell can have a longitudinal axis that is disposed at +/−10°, 20° or other degrees relative to vertical or horizontal. It is also appreciated that lockouts 84 can extend between any structures that when moved between the lowered and raised position will unload the load cells. For example, it is not necessary that lockouts 84 be placed directly adjacent to a load cell assembly. Rather lockouts 84 can be spaced apart from the load cell assemblies. In addition, lockouts 84 can extend directly between support housing 60 and platform 78 (FIG. 3) or between any structures connected to support housing 60 or platform 78.

Figure 11:
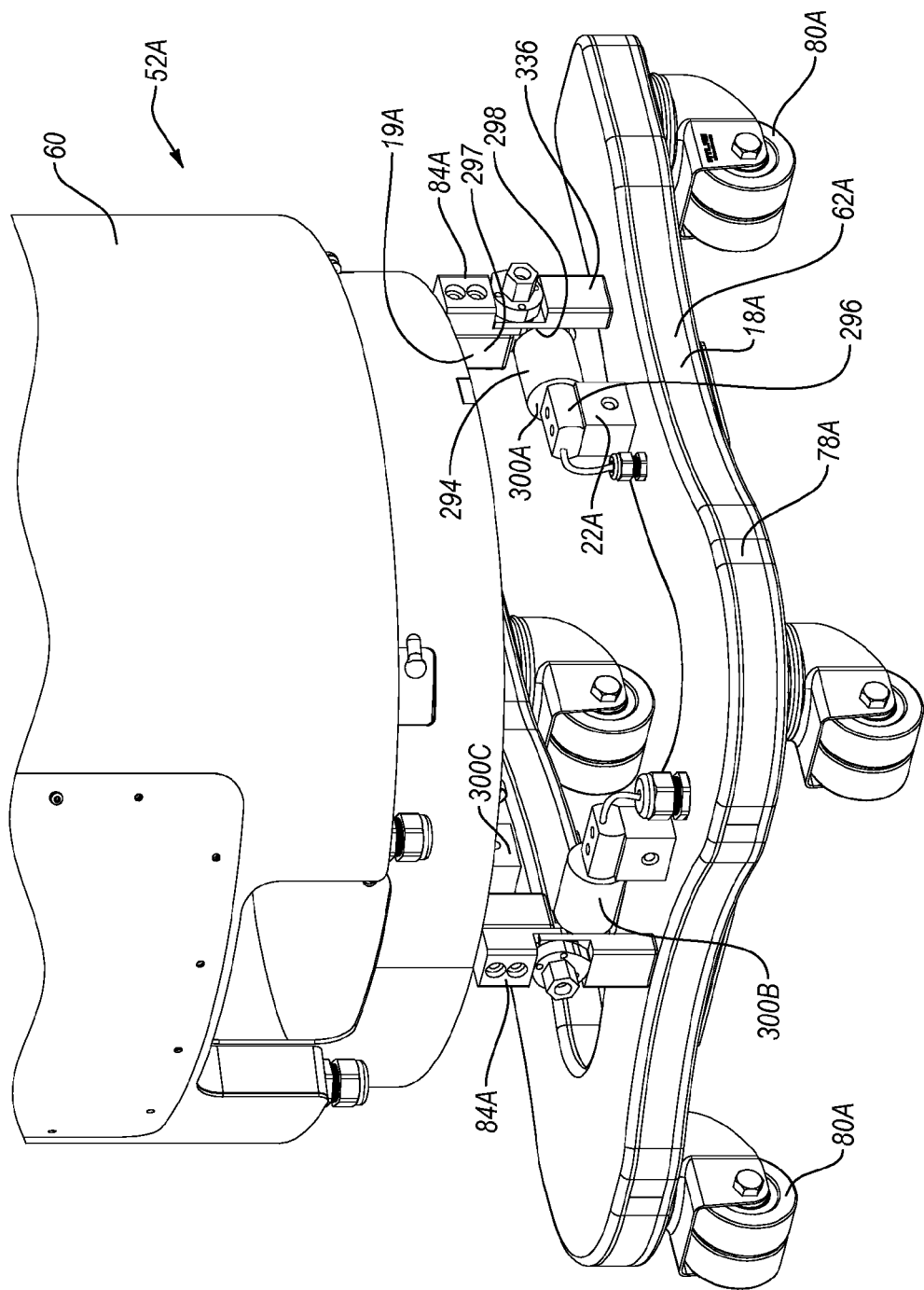
FIG. 11 is a perspective view of an alternative embodiment of a fluid mixing system with a load cell assembly and lockout.

Depicted in FIG. 11 is an alternative embodiment for a container station 52A that can be used as part of fluid dispensing system 50. Like elements between container stations 52 and 52A are identified by like reference characters. Furthermore, all uses and alternatives associated with container station 52 are also applicable to container station 52A. Container station 52A includes support housing 60 resting on a base 62A. Base 62A comprises a platform 78A having a substantially U-shaped configuration. A plurality of wheels 80A are mounted to platform 78A for selective movement thereof. Again, platform 78A can have a variety of different configurations.

Extending between support housing 60 and base 62A are a plurality of spaced apart load cell assemblies 300A-C. Each load cell assembly 300 comprises a load cell 294 having a first end 296 and an opposing second end 298. In this embodiment, load cell 294 also comprises a load cell beam but of a different type than in the prior embodiment. One example of load cell 294 is MTB Load Cell provided by Mettler Toledo. Other types of load cells can also be used. First end 296 of load cell 294 is secured to platform 78A of base 62A by a riser 22A. In this embodiment, platform 78A and riser 22A can combine to form a lower support 18A. Similarly, second end 298 of load cell 294 is secured to support housing 60 through a retainer 297. In this embodiment, retainer 297 also forms an upper support 19A. Load cell 294 is freely suspended between opposing first end 296 and second end 298. Again, load cell assemblies 300A-C combine to measure the total weight and change in weight of support housing 60 and other elements and fluids supported thereon.

Figure 12A:
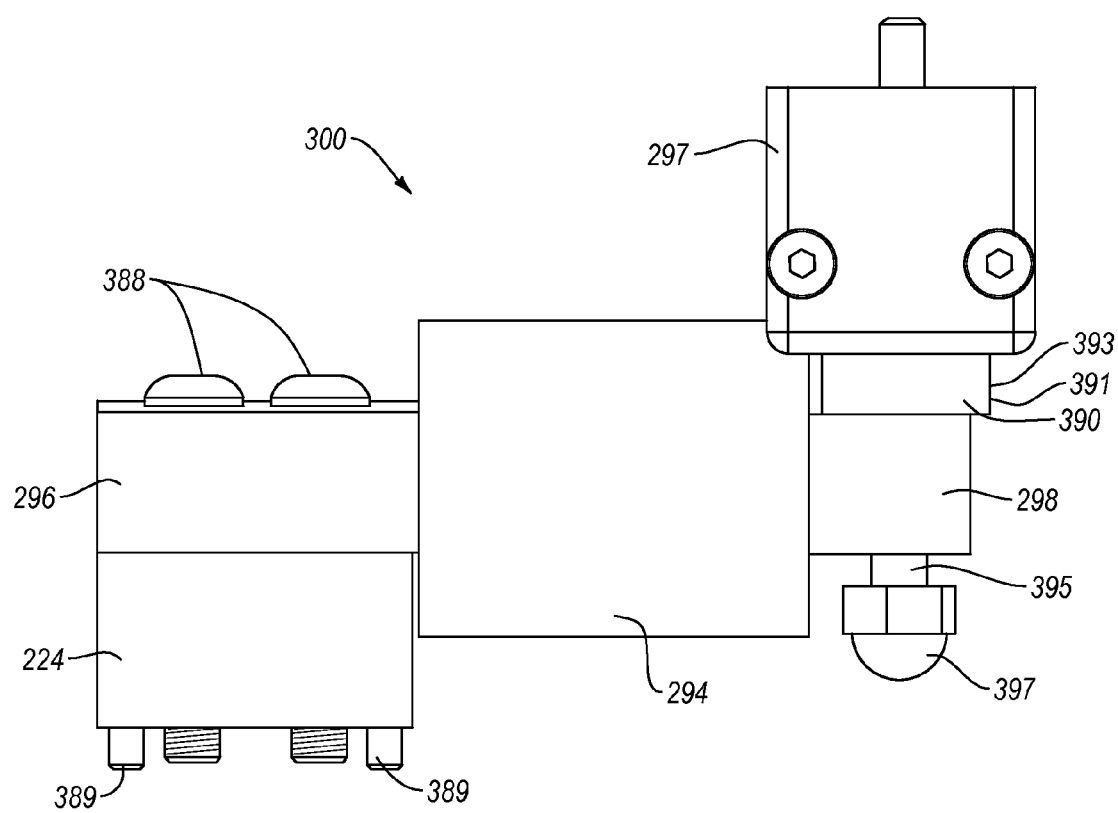
FIG. 12A is an elevated side view of one load cell assembly shown in FIG. 11 in a first weighted position.
Figure 12B:
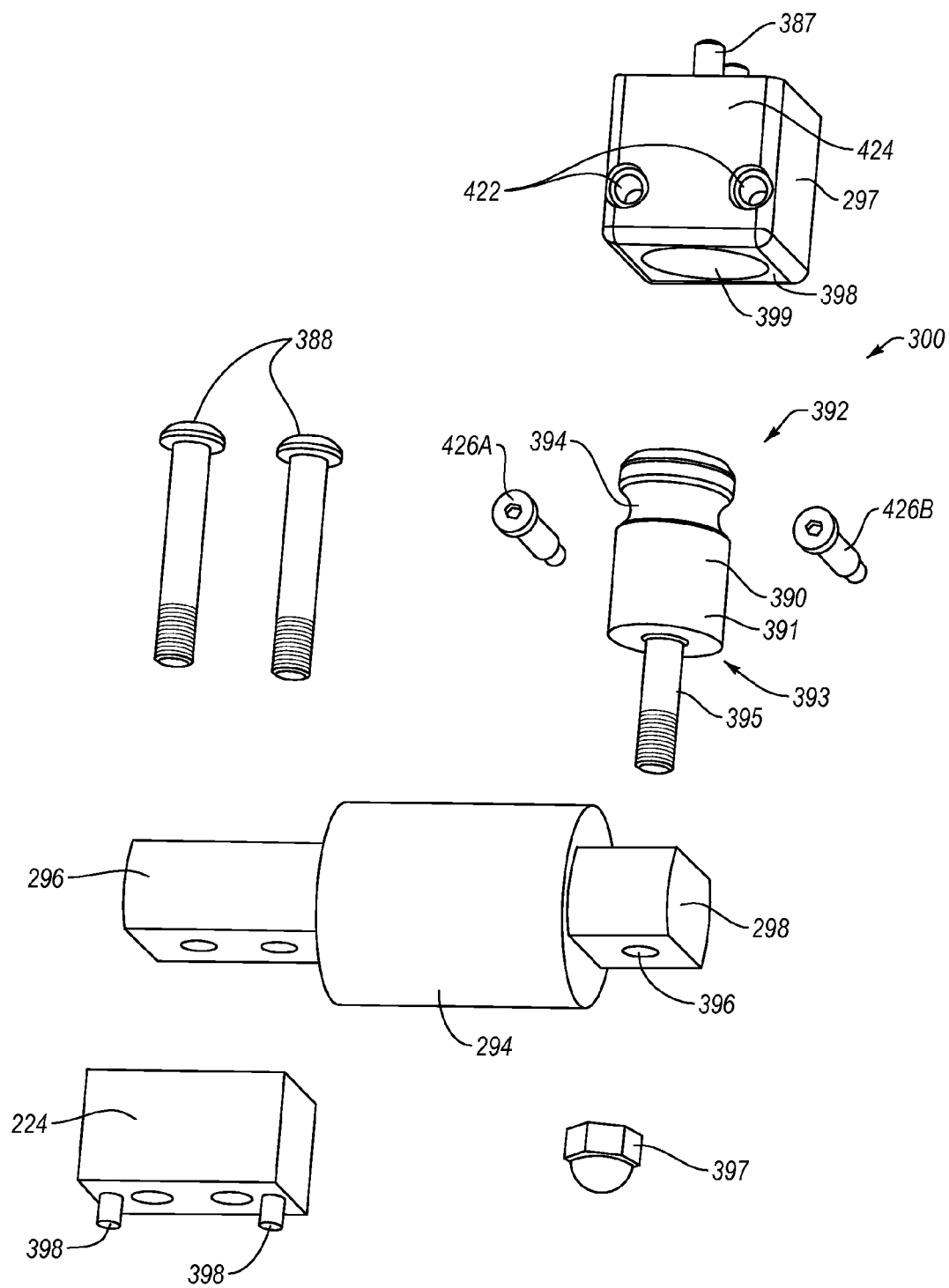
FIG. 12B is an exploded view of the load cell assembly shown in FIG. 12A.

Depicted in FIGS. 12A and 12B are enlarged views of one load cell assembly 300. As shown therein, first end 296 of load cell 294 can be secured to riser 22A by bolts 388 that pass through first end 296 and thread into riser 22A or platform 78A. Riser 22A can be secured to platform 78A by welding, bolts 388, being integrally formed therewith, or otherwise secured. Alignment posts 389 can be formed on the bottom of riser 22A to ensure proper positioning on platform 78A but are not required.

Second end 298 of load cell 294 is connected to retainer 297 by a slip connector 390. Slip connector 390 comprises a body 391, which in this embodiment is cylindrical, having a first end 392 and an opposing second end 393. An annular grove 394 encircles and is recessed on body 391 at or towards first end 392. An elongated stem 395 downwardly projects from second end 393 of body 391. Stem 395 is passed down through an opening 396 on second end 298 of load cell 294 so that stem 395 can freely slide therein. A locking nut 397 is threaded onto the end of stem 395 so as to prevent stem 395 from passing out of opening 396. Stem 395 has a length greater than the thickness of second end 298 of load cell 294 so that even when locking nut 397 is attached to stem 395, slip connector 390 can still slide between a first position, as shown in FIG. 12A, where body 391 is positioned on second end 298 of load cell 294 and a second position, as shown in FIG. 12C, where body 391 is spaced apart from second end 298 of load cell 294.

Retainer 297 can be attached to support housing 60 by welding, bolts, being integrally formed therewith or the like. Alignment stems 387 projecting from retainer 297 can be used to help ensure proper positioning on support housing 60. Retainer 297 has a lower surface 398 with an enlarged pocket 399 formed thereon. A pair of screw holes 422 transversely extend into or through retainer 297 from a side face so as to transversely intersect with opposing sides of pocket 399. Pocket 399 is configured to receive first end 392 of slip connector 390. When first end 392 is received within pocket 399 of retainer 297, fasteners 426A and B can be advanced into screw holes 422 so that fasteners 426 are received within annular groove 394 of slip connector 390. As a result of fasteners 426A and B being received within groove 394, slip connector 390 is secured to retainer 297, i.e., body 391 cannot be pulled out of pocket 399. However, to ensure proper alignment between slip connector 390 and load cell 294 so that there is no binding therebetween that can apply unwanted loads or forces on load cell 294, slip connector 390 is formed to that a small gap is formed between fasteners 426 and the surface of annular groove 394 of slip connector 390. A gap is also formed between body 391 of slip connector 390 and the interior surface of pocket 399 on retainer 297. These spacings are sufficient to enable slip connector 390 to have some free movement relative to fasteners 436 and retainer 297 while fasteners 436 still retain slip connector 390 within pocket 399. In one embodiment, slip connector 390 can move relative to retainer 297 by at least 0.2 mm or 0.3 mm while still being secured to retainer 297. It is appreciated that other methods can also be used to movably secure slip connector 390 to retainer 297 and load cell 294.

Figure 12C:
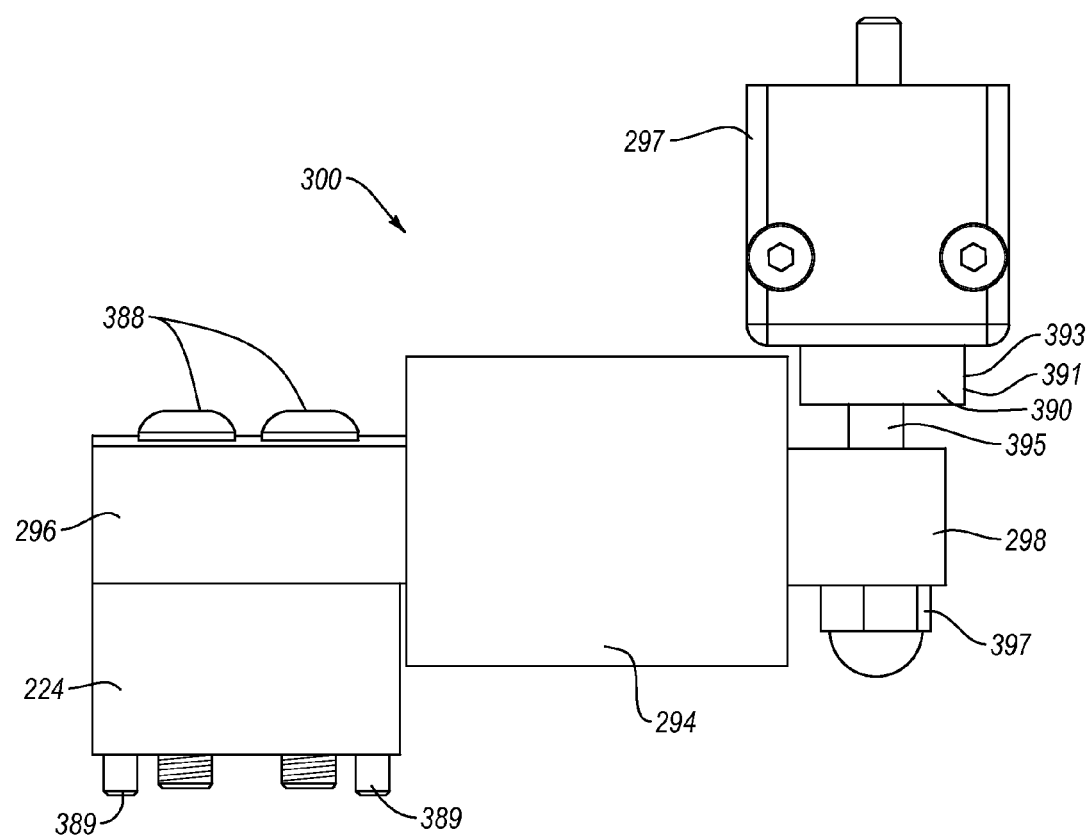
FIG. 12C is an elevated side view of the load cell assembly shown in FIG. 12A in a second unweighted position.
Figure 13:
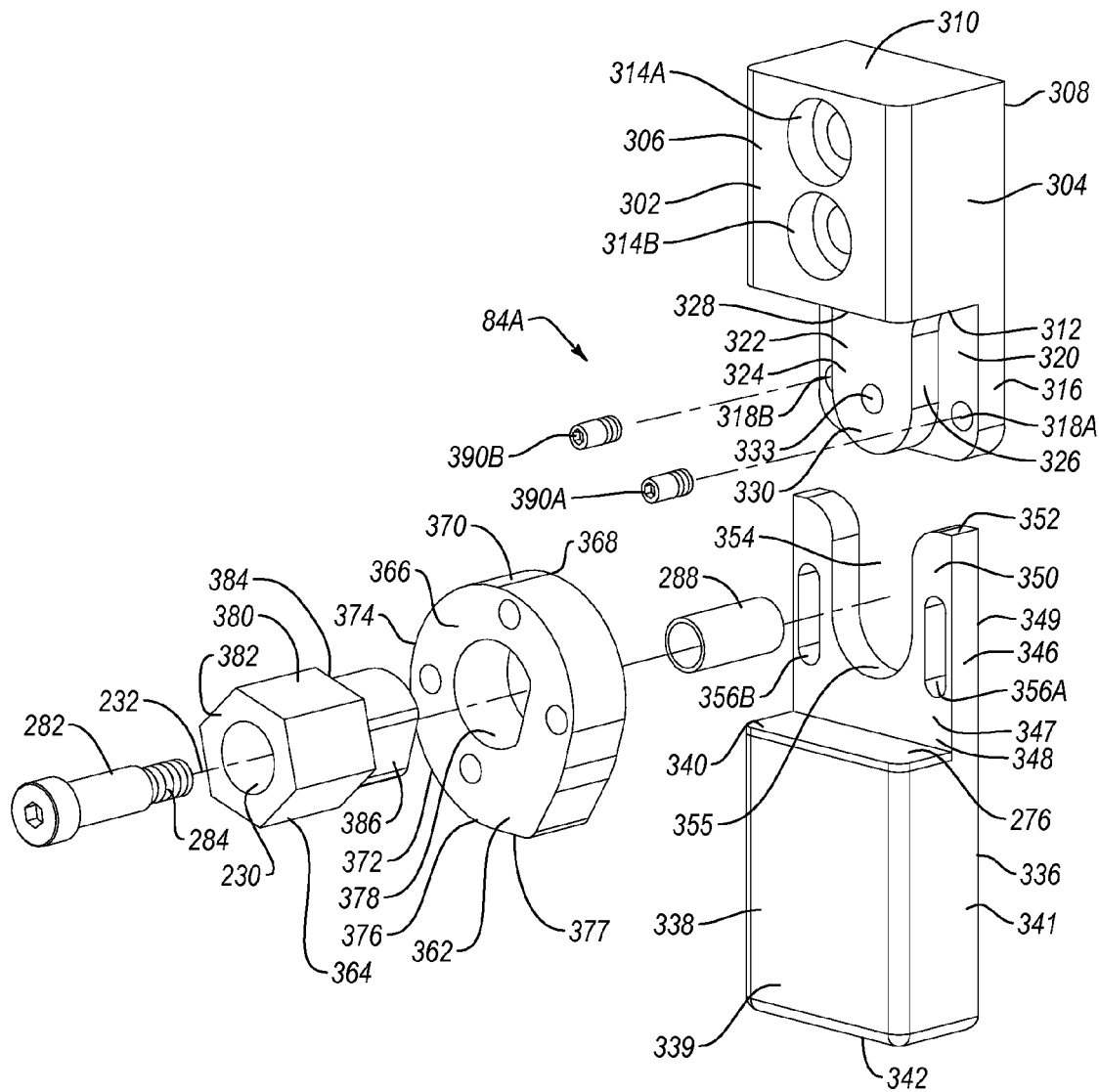
FIG. 13 is an exploded view of the lockout shown in FIG. 11.

In the above configuration, retainer 297 (also considered the upper support) can be concurrently moved with slip connector 390 between the first position as shown in FIG. 12A and the second position as shown in FIG. 12C. In the first position, body 391 of slip connector 393 is resting on second end 298 of load cell 294 so that load cell 294 is loaded with the weight of support housing 60. This configuration is also considered the first position for load cell assembly 300. In the second position, retainer 297 has been raised relative to load cell 294 so that body 391 of slip connector 390 does not rest against or rests to a less extent against second end 298 of load cell 294 and thus load cell 294 is unweighted. This configuration is also considered the second position for load cell assembly 300. It is appreciated that a variety of other alternative designs could also be used for coupling retainer 297 to load cell 294 to permit selective unweighting of load cell 294. Container station 52A further comprises a lockout 84A associated with each load cell assembly 300. As depicted in FIGS. 11 and 13, lockout 84A comprises a stand 302. Stand 302 comprises a base 304 having a boxed shaped configuration that includes a front face 306 and opposing back face 308 that extend between a top surface 310 and an opposing bottom surface 312. A pair of mounting holes 314A and B extend through base 304. Bolts can be passed through mounting holes 314 for securing stand 302 to retainer 297/upper support 19A or some other portion of support housing 60. Stand 302 further comprises a back wall 316 that downwardly projects from bottom surface 312 of base 304 in alignment with back face 308. Spaced apart holes 318A and B are formed on a front face 320 of back wall 316. Outwardly projecting from front face 320 is a guide 322. Guide 322 has a substantially flat front face 324 and a side surface 326 that extends from front face 324 to front face 320 of back wall 316. Guide 322 has a first end 328 that connects to bottom surface 312 of base 304 and has an opposing second end 330 that has an arched or semicircular configuration. An engagement hole 333 is recessed on front face 324 of guide 322 toward second end 330.

Lockout 84A further comprises a lift 336 having a rest 338. Rest 338 has a front face 339 and an opposing back face 341 that extend between a top contact surface 340 and an opposing bottom surface 342. In one embodiment, contact surface 340 is comprised of low friction material layer 276 as previously discussed with regard to FIG. 8. Upwardly extending from contact surface 340 along back face 341 is a guide body 346. Guide body 346 has a front face 347 and an opposing back face 349 that extend from a first end 348 connected to base 338 to a freely disposed second end 350. Second end 350 terminates at a top edge 352. A guide slot 354 terminating at a rounded end 355 is recessed on top edge 352 so as to extend between front face 347 and back face 349. Guide slot 354 has a configuration complimentary to side surface 326 of guide 322 or is otherwise configured so that guide 322 can slide within guide slot 354. A pair of elongated alignment slots 356A and B also extend through guide 346 between front face 347 and back face 349 on opposing sides of guide slot 354.

Lockout 84A further comprises a cam 362 and a separate engager 364. Cam 362 has a front face 366, an opposing back face 368, and a perimeter side edge 370 extending therebetween. Perimeter side edge 370 includes an arched engaging surface 372 that extends from a first end 374 to an opposing second end 376. As with the prior embodiment, engaging surface can be comprised of layer 276 of low friction material. Perimeter side edge 370 also includes a flat locking surface 377 formed adjacent to second end 376. A non-circular keyhole 378 extends through cam 362 and has axis 232 passing therethrough. Cam 362 is configured so that the radius from axis 232 to engaging surface 372 gradually increases from first end 374 to second end 376.

Engager 364 comprises a body 380 that extends from a first end face 382 to an opposing second end face 384. Body 380 has a noncircular transverse cross section that can be polygonal, elliptical, irregular, or other configurations. Projecting from second end face 384 is a key 386 that has a non-circular transverse cross section complementary to keyhole 378. As a result, engager 364 is locked with cam 362 when key 386 is received within key hole 378. Mounting hole 230, as previously discussed with regard to FIGS. 8 and 9, extends through engager 364 and has central longitudinal axis 323 passing therethrough.

During assembly, alignment pins 390A and 390B are secured within holes 318A and B, respectively, so as to outwardly project from stand 302. Lift 335 is then removably coupled with stand 302 by receiving guide rail 324 within guide slot 354 so that alignment pins 390A and 390B project into alignment slots 356A and B, respectively. This configuration enables stand 302 and lift 356 to selectively slide in guided alignment relative to each other but prevents separation along the axis of sliding.

Figure 14:
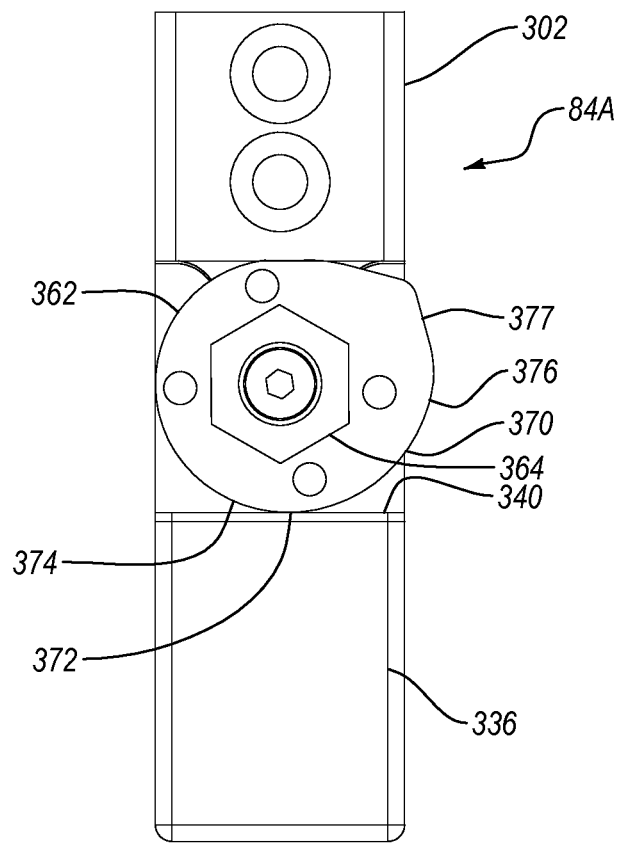
FIG. 14 is a front perspective view of the lockout shown in FIG. 13 with the cam thereof in a first orientation.

Engager 364 is coupled with cam 362 while bushing 288 is advanced over bolt 282. Bolt 282 is then advanced down mounting hole 230 and second end 284 is secured within engagement hole 333 on stand 302. In this configuration, as depicted in FIG. 14, engaging surface 372 of cam 362 is disposed directly against contact surface 340 of lift 336. As depicted in 11, stand 302 is secured to upper support 19A disposed on support housing 60 while lift 336 is disposed on the top surface of platform 78A.

Figure 15:
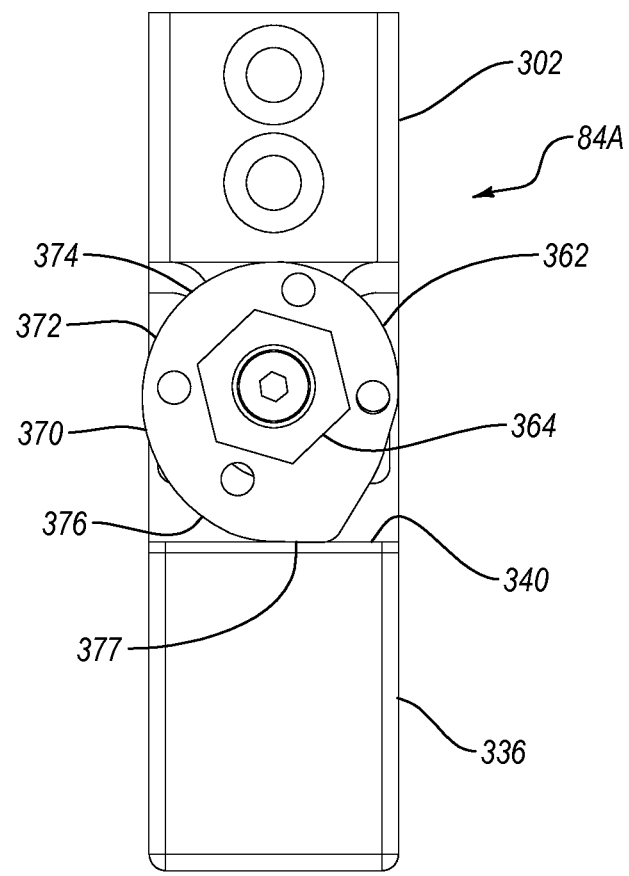
FIG. 15 is a front perspective view of the lockout shown in FIG. 13 with the cam thereof in a second orientation.

In the same manner as previously discussed with regard to lockout 84, lockout 84A can be selectively moved between a lowered first position and a raised second position. In the first position, as depicted in FIG. 14, cam 362 is in a first orientation so that first end 374 of engaging surface 372 of cam 362 is aligned with contact surface 340 of lift 336. In this position, lift 336 can be spaced apart from platform 78A so that the entire load being applied to upper support 19A from support housing 60 is transferred to load cell 294, i.e., slip connector 390 and retainer 297 are in the first position so that slip connector 390 is resting on second end 298 of load cell 294 as shown in FIG. 12A. By rotating engager 364, cam 362 can be rotated to a second orientation as shown in FIG. 15. Flat locking surface 377 sits against contact surface 340 to stop further rotation of cam 362 when cam 362 reaches the second orientation. As cam 362 is rotated, engaging surface 372 slides against contact surface 340 of lift 336 from first end 374 to second end 376. Because of the increase in radius along engaging surface 372, engaging surface 372 biases against contact surface 340 so as to force separation between lift 336 and stand 302 so as to be in the second position. As a result of the separation of lift 336 and stand 362, slip connector 390 and retainer 297 are moved to the second position so that slip connector 390 does not fully rest against second end 298 of load cell 294 as shown in FIG. 12C. As a result, all or a desired portion, such as the percentages previously discussed, of the load that was being applied to load cell 294 from support housing 60 is now transferred through lockout 84A to platform 78A, thereby removing all or the desired portion of the load from load cell 294.

A lockout 84A can be applied to each of load cell assemblies 300A-C for selectively removing the applied load to each of the load cells. In the depicted embodiment, stand 302 of lockout 84A is secured to retainer 297. In an alternative embodiment, stand 302 can be secured directly to the lower end of container 60 which then forms a portion of the upper support 19A. Furthermore, retainer 297 can be eliminated and slip connector 390 can be connected directly to the lower end of container 60. It is appreciated that the same benefits and alternative features as discussed above with regard to lockout 84 are also applicable to lockout 84A. Likewise different features between lockouts 84 and 84A can be mixed and matched.

Figure 16:
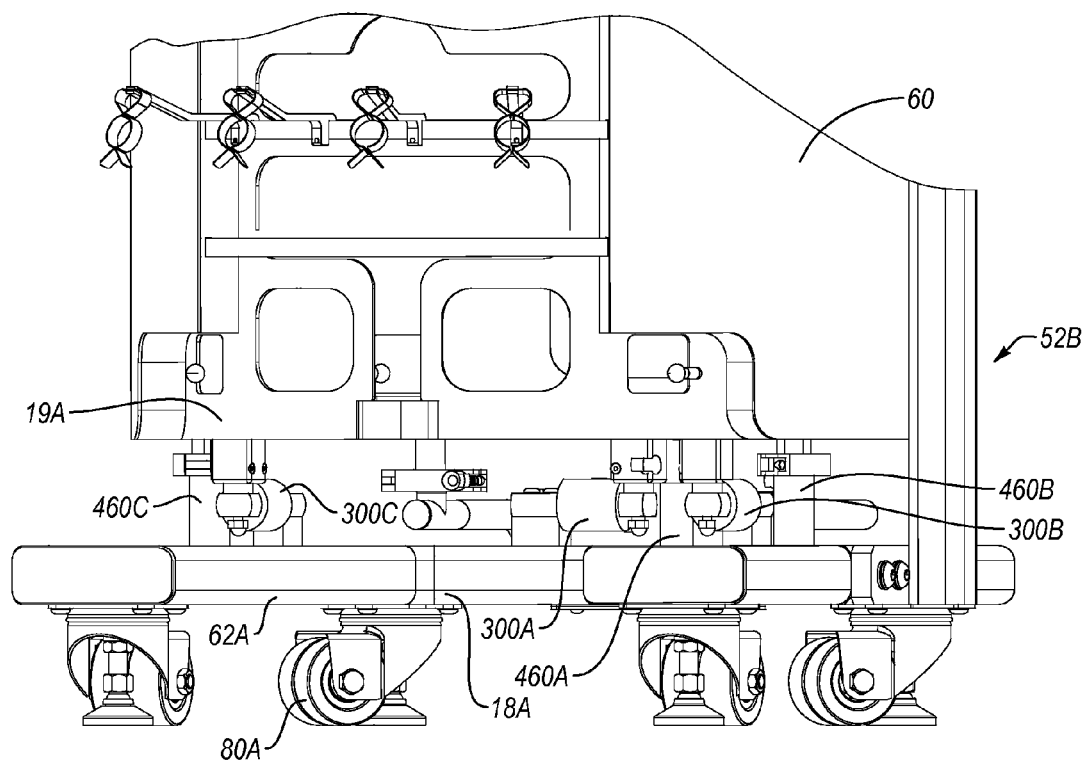
FIG. 16 is a perspective view of an alternative embodiment of a container station.

Depicted in FIG. 16 is another alternative embodiment for a container station 52B that can be used as part of fluid dispensing system 50. Like elements between container stations 52, 52A, and 52B are identified by like reference characters. Furthermore, container stations 52A and 52B can have the same alternative embodiments and can be used in the same ways and with the same equipment, i.e., container assembly 54, as container station 52. Container station 52B includes support housing 60 resting on base 62A. Base 62A comprises platform 78A having a substantially U-shaped configuration with wheels 80A mounted thereon as previously discussed. Again, platform 78A can have a variety of different configurations.

Extending between support housing 60 and base 62A are a plurality of the spaced apart load cell assemblies 300A-C which were discussed above in detail and which operate in the same way as previously discussed. Alternative load cell assemblies can also be used.

Figure 17:
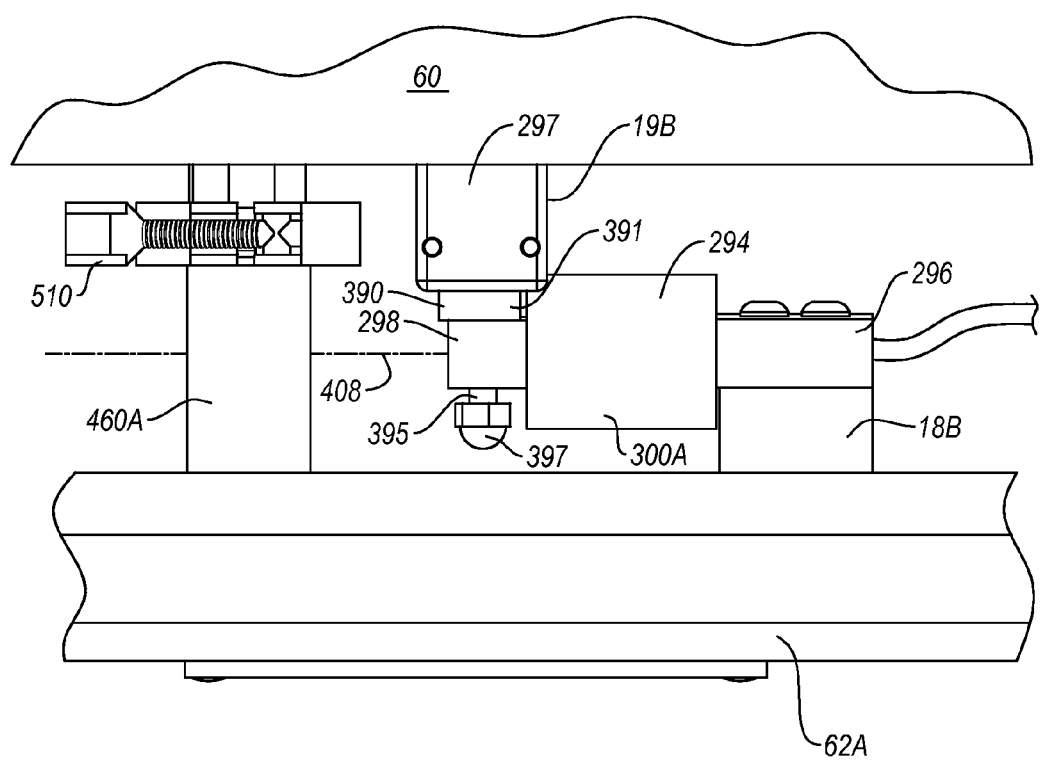
FIG. 17 is a perspective view of the lockout and load cell assembly of the container station shown in FIG. 16.
Figure 18:
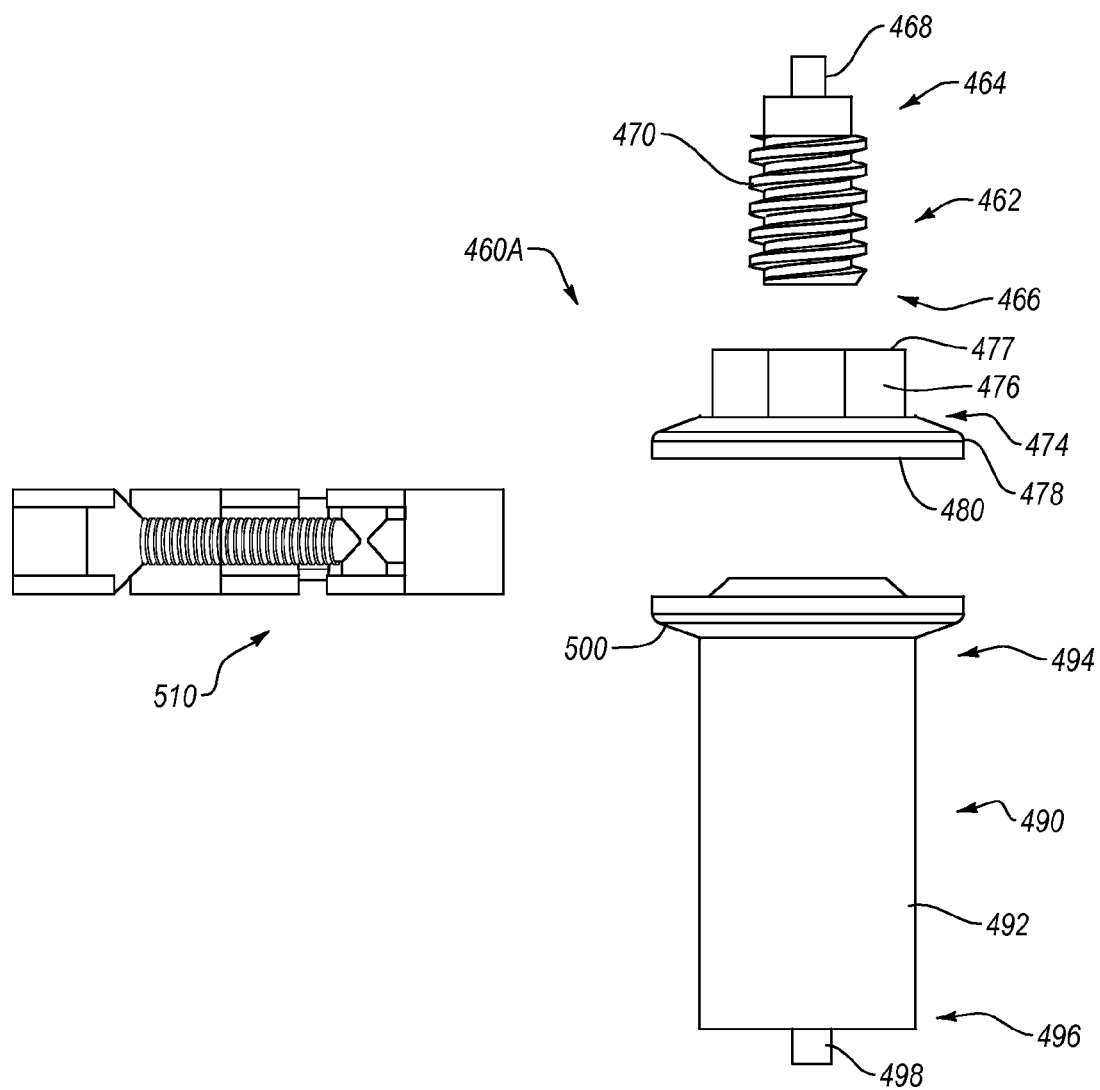
FIG. 18 is an exploded view of the lockout shown in FIG. 17.

As depicted in FIGS. 16 and 17, disposed adjacent to each load cell assembly 300A-C is a corresponding lockout 460A-C. As depicted in FIG. 18, each lockout 460 comprises an engaging stem 462 having a first end 464 and an opposing second end 466. An alignment post 468 outwardly projects from first end 464. During assembly, post 468 is received within a complimentary opening on the floor of support housing 60 and is then secured in place such as by welding, threaded engagement, fastener, or the like. Threads 470 extend along stem 462 and terminate at second end 466. Engaging stem 462 typically has a maximum diameter of at least 1.2 cm and more commonly at least 1.7 cm and is commonly made of a metal, such as stainless steel, thereby ensuring that it has desired strength properties. Other sizes and materials can also be used depending on the size and application of container station 52B.

Figure 19:
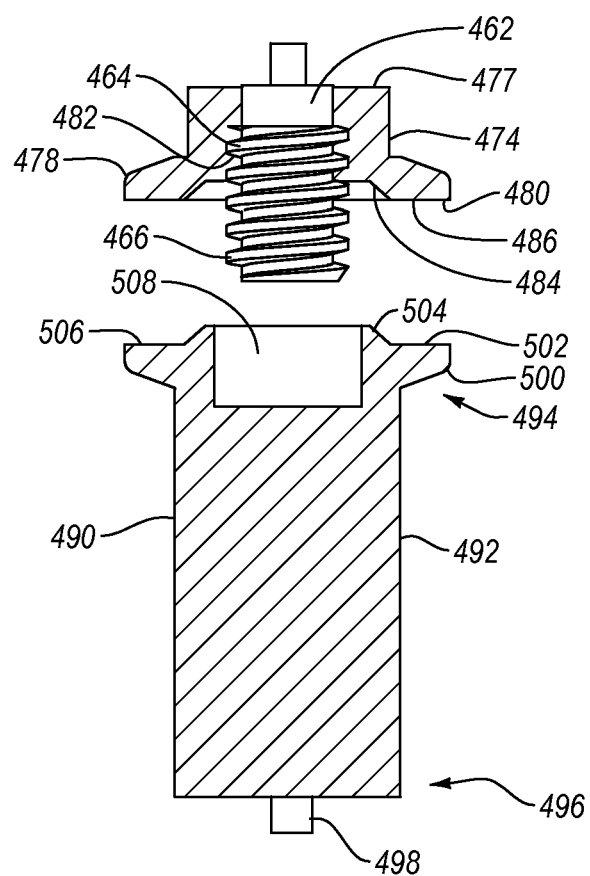
FIG. 19 is a cross sectional side view of the lockout shown in FIG. 18.

Lockout 460 further includes a locking nut 474. Locking nut 474 includes a body 476 having a first end that terminates at a top surface 477 and an opposing second end. Body 476 has a polygonal or other non-circular transverse cross section so that a tool, such as a wrench, can engage body 476 for rotation. Body 476 typically has a maximum diameter of at least 25 cm and more commonly at least 28 cm and is commonly made of a metal, such as stainless steel, thereby ensuring that it has desired strength properties. Other sizes and materials can also be used depending on the size and application of container station 52B. A flange 478 encircles and radially outwardly projects from body 476 at the opposing second end. Flange 478 terminates at a bottom surface 480. As depicted in FIG. 19, a threaded opening 482 extends through body 476 from top surface 477 to bottom surface 480. Opening 482 is configured to threadedly receive and engage stem 462. Bottom surface 480 includes a frustoconical recess 484 that encircles opening 482 and an annular contact surface 486 that encircles frustoconical recess 484.

As also shown in FIGS. 18 and 19, each lockout 460 further comprises a receiver 490. Receiver 490 includes a pedestal 492 having a first end 494 and an opposing second end 496. Pedestal 492 typically has a maximum diameter of at least 25 cm and more commonly at least 28 cm and is commonly made of a metal, such as stainless steel, thereby ensuring that it has desired strength properties. Other sizes and materials can also be used depending on the size and application of container station 52B.

Outwardly projecting from second end 496 is an alignment post 498. During assembly, post 498 is received within a complementary opening of base 62A (FIG. 17) and can then be securely attached by welding, threaded engagement, fastener or other conventional techniques. Encircling and radially outwardly projecting from first end 494 of pedestal 492 is a flange 500. As depicted in FIG. 19, flange 500 terminates at an end face 502. End face 502 includes a frustoconical projection 504 having a configuration complimentary to frustoconical recess 484, and has an annular contact surface 506 that encircles frustoconical projection 504 and is complimentary to contact surface 486. Frustoconical projection 504 and frustoconical recess 484 are configured to facilitate proper centering and alignment between locking nut 474 and receiver 490 when they are brought together.

In alternative embodiments, projection 504 can be formed on locking nut 474 while recess 484 can be formed on receiver 490. In still other embodiments, recess 484 and projection 504 can be eliminated or replaced with other complementary mating surfaces. Contact surfaces 486 and 506 provide complementary flat smooth surfaces that permit locking nut 474 to rotate relatively easily while biasing against receiver 490 and provide a relatively large surface area through which a weight load can be transferred between locking nut 474 and receiver 490.

An opening 508, in the form of a blind pocket, is formed on end face 502 of receiver 490 so as to be encircled by frustoconical projection 504. Opening 508 is sized so that it can freely receive second end 466 of engagement stem 462. As will be discussed below in greater detail, lockout 460 also includes a fastener that secures flanges 478 and 500 together so that locking nut 474 cannot move relative to receiver 490. In other alternative embodiments, the structures can be reversed. For example, receiver 490 can be mounted on the floor of support housing 60 while engaging stem 462 is mounted on base 62A.

Figure 20:
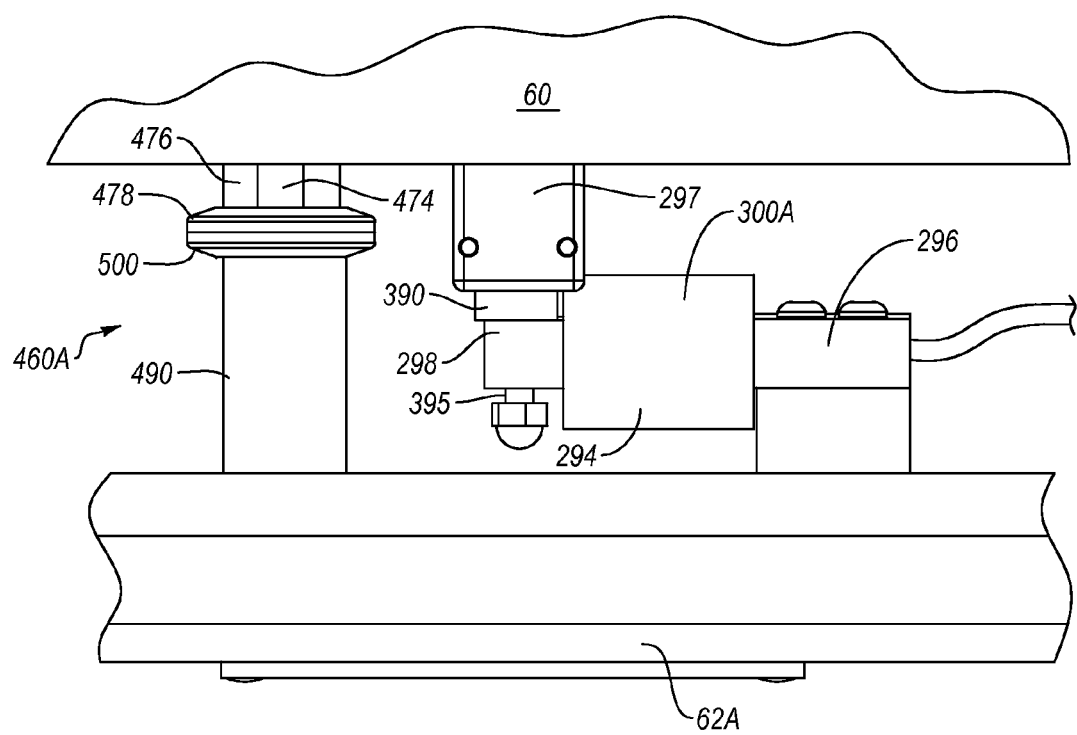
FIG. 20 is perspective view of the assembly shown in FIG. 19 without the fastener and showing the load cell assembly in the first weighted position.

During use, as depicted in FIG. 20, engagement stem 462 (FIG. 21) is secured to support housing 60 and has locking nut 474 threaded thereon while receiver 490 is secured to base 62A in alignment with engagement stem 462 and locking nut 474. Locking nut 474 is rotated about engagement stem 462 so that lockout 460 is in a first position. More specifically, locking nut 460 has been rotated so that it is located at or toward first end 464 of engagement stem 462, such as depicted in FIG. 19. This positioning causes engagement stem 462 to be lowered into opening 508 of receiver 490 which in turn causes support housing 60 to lower so that load cell assembly 300 is in its first position as depicted in FIG. 20 and previously discussed with regard to FIG. 12A. Thus, in this configuration, all of the weight of support housing 60 is being transferred through load cell 294 and none of the weight is being transferred through lockout 460. Also in this configuration, flanges 478 and 500 are aligned and can be disposed adjacent to each other but need not necessarily be contacting as no weight is being transferred therebetween.

Figure 21:
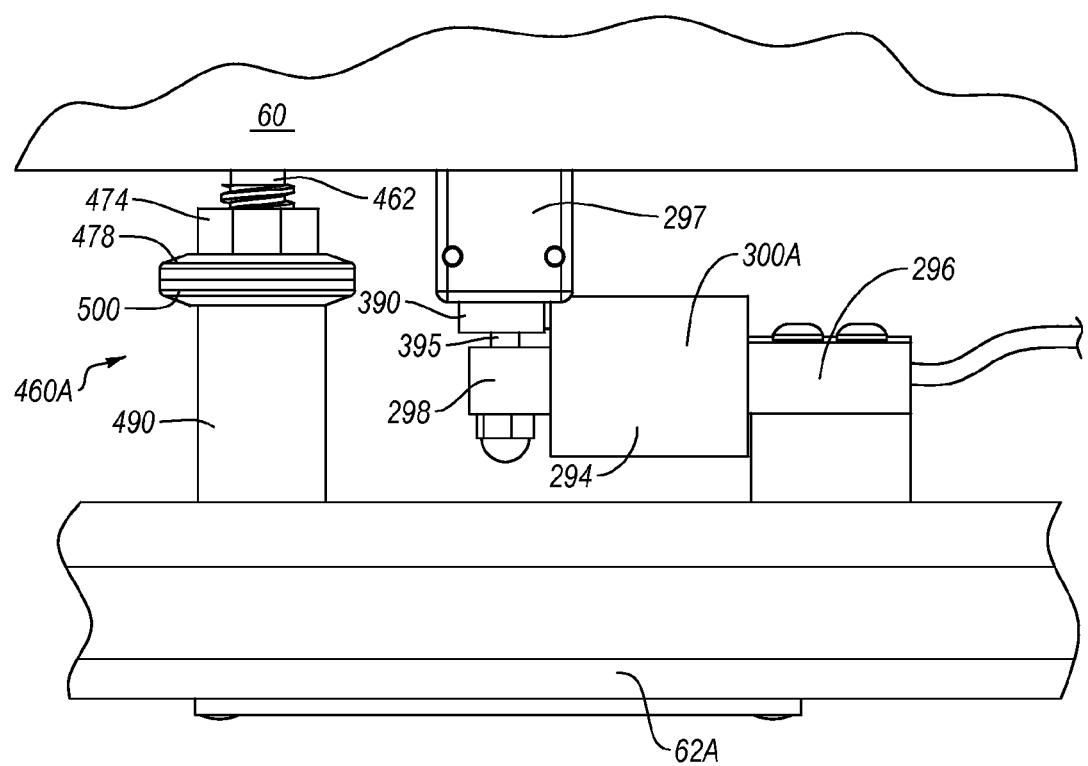
FIG. 21 is perspective view of the assembly shown in FIG. 20 showing the load cell assembly in the second unweighted position.

With flanges 478 and 500 disposed directly adjacent to each other, fastener 510, which can be in the form of a clamp, such as a tri-clamp, or other type of fastener, can be secured around flanges 478 and 500, as depicted in FIG. 17, so as to rigidly secure them together. Fastener 510 thus prevents unwanted movement of locking nut 474 and secures support housing 60 to base 62A to help prevent unwanted tipping of support housing 60 relative to base 62A. In this configuration, the load cells 294 can be used to weigh fluid and/or other components as they are being dispensed into or expelled from the container assembly 54 as previously discussed. As also depicted in FIG. 17, load cell 294 has a central longitudinal axis 408 that extends between first end 296 and opposing second end 298. In the depicted embodiment, lockout 460A is positioned outward from load cell 294 so that central longitudinal axis 408 does not intersect with lockout 460A. This positioning provides easy access to lockout 460A for the manipulation thereof.

Where it is desired to move or service fluid dispensing system 50 without risk or damage to load cells 294 or it is otherwise desired to unweight load cells 294, a wrench or other tool is used to engage body 476 of locking nut 474 and rotate locking nut 474 so that engaging stem 470 is raised within locking nut 474, thereby moving lockout 460 to a second position. Specifically, as locking nut 474 is rotated on receiver 490, engaging stem 470 rises within locking nut 474 which in turn causes support housing 60 to rise so that load cell assembly 300 is moved to its second position as previously discussed with regard to FIG. 12C and as depicted in FIG. 21. In this configuration, load cell 294 is unweighted. With regard to container station 52B, lower support 18A can correspond to base 62A while upper support 19A can correspond to the lower end of support housing 60 between which lockout 460 and load cell 294 are disposed, as depicted in FIG. 16. Retainer 297 and other structure that is disposed between load cell 294 and either base 62A or support housing 60 or between lockout 460 and either base 62A or support housing 60 can also form a portion of lower support 18A or upper support 19A.

Again, each load cell 294 can be completely unweighted or can be unweighted only the sufficient extent needed to preclude unwanted damage to load cell 294. For example, unloading up to 30%, 50%, 70%, or 80% of the weight off of the load cells 294 may be sufficient. These percentages are also applicable to the other embodiments herein. In one embodiment of the present invention, locking nut 474 and engagement stem 462 are formed with relatively large threads having a large spacing so that load cell assembly 300 can be moved from the fully weighted first position to the fully unweighted second position by minimal rotation of locking nut 474. For example, in some embodiments, load cell assembly 300 can be moved from the fully weighted first position to the fully unweighted second position by less than 2 full rotations of locking nut 474 and more commonly less than 1 full rotations of locking nut 474.

Once each of the load cells 294 is sufficiently unweighted using the above process, again fastener 510 can be secured onto flanges 478 and 500 so as to secure them in place and prevent locking nuts 474 from unintentionally moving relative to receivers 490. In this position, fluid dispensing system 50 can be serviced or moved to a new desired location without risk or damage to load cells 294, including when container assembly 54 is full or partially full of fluid or even empty. In each of the disclosed embodiments herein, it is appreciated that the lockouts are sufficiently strong so that they can carry without failure, such as elastic deformation, the full weight of support housing 60 and container assembly 54 when container assembly 54 is full to capacity with a fluid, such as the fluids discussed herein, or is filled up to or to at least 60%, 75% or 90% of full capacity. These percentages are also applicable to the other embodiments herein. Once dispensing system 50 is moved to a desired location, the above process is reversed by removing fastener 570 and again rotating locking nut 474 in the opposite direction so as to lower support housing 60 and again move load cell assemblies 300 into the first position where they are weighted.

The inventive lockout system disclosed herein, depending on the embodiment and specific design, can have a number of advantages. For example, the inventive systems enable the load cells to be completely or partially unweighted even when container assembly 54 if full or partially full of fluid. Furthermore, the lockouts are easily accessible and can be moved between the discussed first and second position with minimal effort. Specifically, minimal rotation of the cam or locking nut is required to move between the different locations and, because of their design, minimal force is required to rotate the cam and locking nut. Other advantages are also present.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for locking out load cells, the method comprising:
    dispensing a fluid into a collapsible bag that is supported within a support housing, the support housing resting on a plurality of load cells that sense the weight of the fluid;
    manipulating a plurality of lockouts located adjacent to corresponding load cells from a first position to a second position so that the lockouts remove at least a portion of the weight of the fluid from the plurality of load cells;
    moving the support housing containing the collapsible bag with the fluid therein to a new location; and
    further manipulating the plurality of lockouts from the second position back to the first position so that the plurality of load cells again sense the full weight of the fluid within the collapsible bag.

2. The method as recited in claim 1, wherein the fluid within the collapsible bag is sterile.

3. The method as recited in claim 1, wherein the fluid within the bag comprises media in which cells can be grown, buffers, reagents or a culture of cells or microorganisms.

4. The method as recited in claim 1, wherein the collapsible bag is filled to at least 75% of full capacity with the fluid.

5. The method as recited in claim 1, wherein the step of manipulating the plurality of lockouts comprises rotating a lockout nut or a cam which forms a portion of each lockout.

6. The method as recited in claim 1, wherein the step of manipulating the plurality of lockouts from the first position to the second position removes at least half of the weight of the fluid from the load cells.

7. The method as recited in claim 1, further comprising:
    each load cell being disposed between a lower support and an upper support, the weight of the fluid being transferred through the upper support to each of the load cells;
    each lockout comprising:
        a receiver coupled with one of the lower support or the upper support, the receiver having an end surface with an opening formed thereon;
        a stem coupled with the other of the lower support or the upper support, at least a portion of the stem being freely received within the opening of the receiver so that the stem can freely slide within the opening; and
        a lockout nut threaded onto the stem such that rotation of the lockout nut in a first direction causes the lockout to be in the second position and rotation of the lockout nut in an opposing second direction causes the lockout to be in the first position.

8. The method as recited in claim 7, further comprising attaching a fastener to at least one lockout when the lockout is in the first position, the fastener securing the locking nut to the receiver.

9. The method as recited in claim 8, wherein the fastener comprises a clamp.

10. A load cell lockout system comprising:
    a lower support;
    an upper support;
    a load cell disposed between the lower support and the upper support, the upper support being movable relative to the lower support between a first position wherein a first load is applied by the upper support to the load cell and a second position wherein either a second load that is lighter than the first load is applied by the upper support to the load cell or no load is applied by the upper support to the load cell; and
    a lockout comprising:
        a receiver coupled with one of the lower support or the upper support, the receiver having an end surface with an opening formed thereon;
        a stem coupled with the other of the lower support or the upper support, at least a portion of the stem being freely received within the opening of the receiver so that the stem can freely slide within the opening; and
        a lockout nut threaded onto the stem such that rotation of the lockout nut in a first direction causes the upper support to move to the second position and rotation of the lockout nut in an opposing second direction causes the upper support to move to the first position.

11. The load cell lockout system as recited in claim 10, further comprising:
    the end surface of the receiver having a frustoconical projection or frustoconical recess formed thereon; and
    the lockout nut having an end surface with the other of the frustoconical projection or frustoconical recess formed thereon so that the end surface of the lockout nut complementary mates with the end surface of the receiver.

12. The load cell lockout system as recited in claim 10, further comprising a fastener securing the lockout nut to the receiver when the upper support is in the first position.

13. The load cell lockout system as recited in claim 10, further comprising:
    the receiver comprising a pedestal having an outwardly projecting flange;
    the locking nut having an outwardly projecting flange; and
    a clamp removably engaging the flange on the receiver and the flange on the locking nut so as to secure the receiver and locking nut together.

14. The load cell lockout system as recited in claim 10, further comprising a slip connector securing one end of the load cell to the upper support, the slip connector securing the load cell to the upper support but allowing some movement between the slip connector and the load cell.

15. The load cell lockout system as recited in claim 14, wherein the slip connector is secured to the upper support so that some free movement is permitted between the slip connector and the upper support.

16. The load cell lockout system as recited in claim 10, wherein the load cell comprises a load cell beam having a first end and an opposing second end with a central longitudinal axis extending therebetween, the first end of the load cell beam being secured to the lower support and the second end of the load cell beam being biased against or secured to the upper support when the upper support is in the first position, the longitudinal axis of the load cell being horizontally disposed within a variance of +/−10°.

17. The load cell lockout system as recited in claim 16, wherein the lockout is offset from the central longitudinal axis of the load cell beam so that the central longitudinal axis does not intersect with the lockout.

18. The load cell lockout system as recited in claim 10, wherein the upper support comprises or is secured to a support housing, the support housing bounding a chamber having a volume of at least 40 liters.

19. The load cell lockout system as recited in claim 18, further comprising:
 a collapsible bag disposed within the support housing; and
 means for mixing a fluid within the collapsible bag.

20. The load cell lockout system as recited in claim 10, wherein the lower support comprises or is secured to a movable platform having wheels.

21. A load cell lockout system comprising:
 a lower support;
 an upper support;
 a load cell disposed between the lower support and the upper support, the upper support being movable relative to the lower support between a first position wherein a first load is applied by the upper support to the load cell and a second position wherein either a second load that is lighter than the first load is applied by the upper support to the load cell or no load is applied by the upper support to the load cell; and
 a lockout comprising:
  a receiver coupled with one of the lower support or the upper support, the receiver having an end surface with an opening formed thereon;
  a stem coupled with the other of the lower support or the upper support, at least a portion of the stem being received within the opening of the receiver;
  a lockout nut threaded onto the stem such that rotation of the lockout nut in a first direction causes the upper support to move to the second position and rotation of the lockout nut in an opposing second direction causes the upper support to move to the first position; and
  a fastener securing the lockout nut to the receiver when the upper support is in the first position.

22. The load cell lockout system as recited in claim 21, further comprising:
 the receiver comprising a pedestal having an outwardly projecting flange;
 the locking nut having an outwardly projecting flange; and
 the fastener comprising a clamp removably engaging the flange on the receiver and the flange on the locking nut.

23. The load cell lockout system as recited in claim 21, further comprising:
 the end surface of the receiver having a frustoconical projection or frustoconical recess formed thereon; and
 the lockout nut having an end surface with the other of the frustoconical projection or frustoconical recess formed thereon so that the end surface of the lockout nut complementary mates with the end surface of the receiver.

24. The load cell lockout system as recited in claim 21, further comprising a slip connector securing one end of the load cell to the upper support, the slip connector securing the load cell to the upper support but allowing some movement between the slip connector and the load cell.

\* \* \* \* \*